US012749443B2

(12) United States Patent
Ren et al.

(10) Patent No.: US 12,749,443 B2
(45) Date of Patent: Sep. 29, 2026

(54) PIXEL DRIVING CIRCUIT AND DISPLAY APPARATUS

(71) Applicant: BOE Technology Group Co., Ltd., Beijing (CN)

(72) Inventors: Jinyu Ren, Beijing (CN); Fangzhen Zhang, Beijing (CN); Xinxing Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 141 days.

(21) Appl. No.: 18/857,890

(22) PCT Filed: Aug. 31, 2023

(86) PCT No.: PCT/CN2023/116138
§ 371 (c)(1),
(2) Date: Oct. 18, 2024

(87) PCT Pub. No.: WO2025/043605
PCT Pub. Date: Mar. 6, 2025

(65) Prior Publication Data

US 2026/0188212 A1 Jul. 2, 2026

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2300/0852* (2013.01); *G09G 2310/08* (2013.01)

(58) Field of Classification Search
CPC ....... G09G 2310/08; G09G 2320/0233; G09G 3/3233
See application file for complete search history.

(56) References Cited

U.S. PATENT DOCUMENTS

| | | | | |
|---|---|---|---|---|
| 2019/0043426 | A1* | 2/2019 | Zhang | G09G 3/3225 |
| 2021/0312864 | A1* | 10/2021 | Zheng | G09G 3/3233 |
| 2022/0122531 | A1* | 4/2022 | Zheng | G09G 3/3233 |

* cited by examiner

*Primary Examiner* — Nan-Ying Yang
(74) *Attorney, Agent, or Firm* — HOUTTEMAN LAW LLC

(57) ABSTRACT

The present disclosure provides a pixel driving circuit and a display apparatus, and belongs to the field of display technology. The pixel driving circuit includes a gate driving sub-circuit configured to output a gate driving signal with an adjustable duty ratio; a first light-emitting control sub-circuit configured to control the first voltage control sub-circuit to output a first light-emitting voltage or control the second voltage control sub-circuit to output a second light-emitting voltage by a data voltage signal in response to a light-emitting control signal; a light-emitting time control sub-circuit configured to output the first light-emitting voltage or the second light-emitting voltage received by the light-emitting time control sub-circuit under the control of the gate driving signal; and a second light-emitting control sub-circuit configured to output the received first or second light-emitting voltage to a light-emitting device to be driven under the control of the light-emitting control signal.

20 Claims, 9 Drawing Sheets

PIXEL DRIVING CIRCUIT AND DISPLAY APPARATUS

TECHNICAL FIELD

The present disclosure relates to the field of display technology, and in particular to a pixel driving circuit and a display apparatus.

BACKGROUND

PAM (pulse amplitude modulation) is a main driving mode of grey scales of a current display product. With the continuous development of a series of display technologies including LCD (liquid crystal display), OLED (organic light-emitting diode), LED (light-emitting diode), and QD (quantum dot) and the like, disadvantages of the PAM are more and more prominent, including the high driving power consumption, the generation of large quantities of heat, and the unachievable low grey scale display and the like. Therefore, a PWM (pulse width modulation) driving mode of grey scales is introduced on the basis of the PAM so as to solve the problem. With such a PWM driving mode, a complexity of a driving circuit is greatly increased, which does not facilitate the development of high PPI (pixels per inch), narrow border and other high and new technologies, and can reduce the yield and further increase the cost. A driving frequency of the current PWM is low and is bad for eyes to some extent, so that the driving frequency is necessarily and further improved to achieve the healthy display. The current PWM driving mode is full-screen driving, or a timing signal with a constant duty ratio is introduced into a pixel driving circuit in the PWM driving mode, and the PWM driving mode is matched with the PAM driving mode to realize the low gray scale display (the display at a low gray scale). These two circuit designs increase the complexity of the driving circuit, and do not eliminate the problems of the high power consumption and the generation of large quantities of heat.

SUMMARY

The present disclosure is directed to at least one of the technical problems in the related art, and provides a pixel driving circuit and a display apparatus.

The embodiment of the present disclosure provides a pixel driving circuit, including a gate driving sub-circuit, a first light-emitting control sub-circuit, a first voltage control sub-circuit, a second voltage control sub-circuit, a light-emitting time control sub-circuit and a second light-emitting control sub-circuit; wherein the gate driving sub-circuit is configured to output a gate driving signal with an adjustable duty ratio; the first light-emitting control sub-circuit is configured to control the first voltage control sub-circuit to output a first light-emitting voltage by a data voltage signal or control the second voltage control sub-circuit to output a second light-emitting voltage by the data voltage signal in response to a light-emitting control signal; the light-emitting time control sub-circuit is configured to output the first light-emitting voltage or the second light-emitting voltage received by the light-emitting time control sub-circuit under the control of the gate driving signal; and the second light-emitting control sub-circuit is configured to output the received first light-emitting voltage or the received second light-emitting voltage to a light-emitting device to be driven under the control of the light-emitting control signal; wherein the gate driving sub-circuit includes: an input module configured to control a signal output terminal to output a first power voltage or a second power voltage in response to an input control signal; a reset module configured to reset a first node through a reset signal in response to the reset signal; wherein the first node is a connecting node between the output module and the duty ratio adjusting module; a duty ratio adjusting module configured to control a potential at the first node through a data voltage control signal in response to the light-emitting control signal; and an output module configured to output the gate driving signal with a corresponding duty ratio through a signal output terminal in response to the potential at the first node; wherein a potential of the gate driving signal is switched between the first power voltage and the second power voltage.

In some embodiments, the input module includes a first transistor, a first electrode of the first transistor is connected to a second power voltage terminal, a second electrode of the first transistor is connected to the output module, and a control electrode of the first transistor is connected to an input signal control terminal.

In some embodiments, the reset module includes a second transistor, a first electrode of the second transistor is connected to the first node, and a second electrode of the second transistor is connected to a control electrode of the second transistor and a reset signal terminal.

In some embodiments, the output module includes a third transistor, a first storage capacitor, and a second storage capacitor; and switching characteristics of the third transistor are opposite to switching characteristics of the second transistor; and a first electrode of the third transistor is connected to a first power voltage terminal, a second electrode of the third transistor is connected to the signal output terminal and a first terminal of the first storage capacitor, and a control electrode of the third transistor is connected to the first node, a second terminal of the first storage capacitor is connected to a second terminal of the second storage capacitor and the second power voltage terminal, and a first terminal of the second storage capacitor is connected to the first node.

In some embodiments, the duty ratio adjusting module includes a fourth transistor, a fifth transistor, a sixth transistor, a seventh transistor, an eighth transistor, and a third storage capacitor, switching characteristics of the fourth transistor and the seventh transistor are opposite to switching characteristics of the second transistor, and switching characteristics of the fifth transistor, the sixth transistor, and the eighth transistor are all the same as the switching characteristics of the second transistor; and a first electrode of the fourth transistor is connected to the first node, a second electrode of the fourth transistor is connected to a first electrode of the fifth transistor and a first electrode of the sixth transistor, and a control electrode of the fourth transistor is connected to the reset signal terminal, a second electrode of the fifth transistor is connected to a second electrode of the sixth transistor and the second power voltage terminal, and a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, and a control electrode of the seventh transistor is connected to a light-emitting control signal terminal, a control electrode of the eighth transistor is connected to the light-emitting control signal terminal, and a second terminal of the third storage capacitor is connected to a first power voltage terminal.

In some embodiments, the duty ratio adjusting module includes a fifth transistor, a sixth transistor, a seventh transistor, an eighth transistor, and a third storage capacitor, switching characteristics of the seventh transistor are opposite to switching characteristics of the second transistor, and switching characteristics of the fifth transistor, the sixth transistor, and the eighth transistor are all the same as the switching characteristics of the second transistor; and a first electrode of the fifth transistor is connected to a first electrode of the sixth transistor and the first node, a second electrode of the fifth transistor is connected to a second electrode of the sixth transistor and the second power voltage terminal, and a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, and a control electrode of the seventh transistor is connected to a light-emitting control signal terminal, a control electrode of the eighth transistor is connected to the light-emitting control signal terminal, and a second terminal of the third storage capacitor is connected to a first power voltage terminal.

In some embodiments, the input module includes a first transistor, a first electrode of the first transistor is connected to a first power voltage terminal, a second electrode of the first transistor is connected to the output module, and a control electrode of the first transistor is connected to an input signal control terminal.

In some embodiments, the reset module includes a second transistor, a first electrode of the second transistor is connected to the first node, and a second electrode of the second transistor is connected to a control electrode of the second transistor and a reset signal terminal.

In some embodiments, the output module includes a third transistor, a first storage capacitor and a second storage capacitor, and switching characteristics of the third transistor are opposite to switching characteristics of the second transistor; and a first electrode of the third transistor is connected to a second power voltage terminal, a second electrode of the third transistor is connected to the signal output terminal and a first terminal of the first storage capacitor, a control electrode of the third transistor is connected to the first node, a second terminal of the first storage capacitor is connected to a second terminal of the second storage capacitor and the second power voltage terminal, and a first terminal of the second storage capacitor is connected to the first node.

In some embodiments, the duty ratio adjusting module includes a fourth transistor, a fifth transistor, a sixth transistor, a seventh transistor, an eighth transistor, and a third storage capacitor, switching characteristics of the fourth transistor and the seventh transistor are opposite to switching characteristics of the second transistor, and switching characteristics of the fifth transistor, the sixth transistor, and the eighth transistor are all the same as the switching characteristics of the second transistor; and a first electrode of the fourth transistor is connected to the first node, a second electrode of the fourth transistor is connected to a first electrode of the fifth transistor and a first electrode of the sixth transistor, a control electrode of the fourth transistor is connected to the reset signal terminal, a second electrode of the fifth transistor is connected to a second electrode of the sixth transistor and the first power voltage terminal, a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, a control electrode of the seventh transistor is connected to a light-emitting control signal terminal, a control electrode of the eighth transistor is connected to the light-emitting control signal terminal, and a second terminal of the third storage capacitor is connected to the first power voltage terminal.

In some embodiments, the duty ratio adjusting module includes a fifth transistor, a sixth transistor, a seventh transistor, an eighth transistor, and a third storage capacitor, switching characteristics of the seventh transistor are opposite to switching characteristics of the second transistor, and switching characteristics of the fifth transistor, the sixth transistor, and the eighth transistor are all the same as the switching characteristics of the second transistor; and a first electrode of the fifth transistor is connected to a first electrode of the sixth transistor and the first node, a second electrode of the fifth transistor is connected to a second electrode of the sixth transistor and the first power voltage terminal, a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, a control electrode of the seventh transistor is connected to a light-emitting control signal terminal, a control electrode of the eighth transistor is connected to the light-emitting control signal terminal, and a second terminal of the third storage capacitor is connected to the first power voltage terminal.

In some embodiments, the first light-emitting control sub-circuit includes an eleventh transistor and a fourth storage capacitor, and switching characteristics of the eleventh transistor are opposite to switching characteristics of the second transistor; and a first electrode of the eleventh transistor is connected to a data signal terminal, a second electrode of the eleventh transistor is connected to a first terminal of the fourth storage capacitor, the first voltage control sub-circuit and the second voltage control sub-circuit, a control electrode of the eleventh transistor is connected to a light-emitting control signal terminal, and a second terminal of the fourth storage capacitor is connected to the first power voltage terminal.

In some embodiments, the first voltage control sub-circuit includes a twelfth transistor, the second voltage control sub-circuit includes a thirteenth transistor, and switching characteristics of the twelfth transistor are the same as switching characteristics of the eleventh transistor and are opposite to switching characteristics of the thirteenth transistor; and a first electrode of the twelfth transistor is connected to a first voltage terminal, a second electrode of the twelfth transistor is connected to a second electrode of the thirteenth transistor and the light-emitting time control sub-circuit, a control electrode of the twelfth transistor is connected to a control electrode of the thirteenth transistor and a second electrode of the eleventh transistor, and a first electrode of the thirteenth transistor is connected to a second voltage terminal.

In some embodiments, the first light-emitting control sub-circuit includes an eleventh transistor, a fourteenth transistor, a fourth storage capacitor, and a fifth storage capacitor, and switching characteristics of the eleventh transistor are opposite to switching characteristics of the second transistor and are the same as switching characteristics of the fourteenth transistor; a first electrode of the eleventh transistor is connected to a data signal terminal, a second electrode of the eleventh transistor is connected to a first terminal of the fourth storage capacitor and the first voltage control sub-circuit, a control electrode of the eleventh transistor is connected to the light-emitting control signal terminal, and a second terminal of the fourth storage capacitor is connected to the first power voltage terminal; and a first electrode of the fourteenth transistor is connected to the data signal terminal, a second electrode of the fourteenth transistor is connected to a first terminal of the fifth storage capacitor and the second voltage control sub-circuit, a control electrode of the fourteenth transistor is connected to the light-emitting control signal terminal, and a second terminal of the fifth storage capacitor is connected to the first power voltage terminal.

In some embodiments, the first voltage control sub-circuit includes a twelfth transistor, the second voltage control sub-circuit includes a thirteenth transistor, and switching characteristics of the twelfth transistor are opposite to switching characteristics of the thirteenth transistor; and a first electrode of the twelfth transistor is connected to a first voltage terminal, a second electrode of the twelfth transistor is connected to a second electrode of the thirteenth transistor and the light-emitting time control sub-circuit, a control electrode of the twelfth transistor is connected to a control electrode of the thirteenth transistor and a second electrode of the eleventh transistor, and a first electrode of the thirteenth transistor is connected to a second voltage terminal.

In some embodiments, the switching characteristics of the thirteenth transistor and the eleventh transistor are the same.

In some embodiments, the light-emitting time control sub-circuit includes a ninth transistor and switching characteristics of the ninth transistor are the same as switching characteristics of the second transistor; and a first electrode of the ninth transistor is connected to the first voltage control sub-circuit and the second voltage control sub-circuit, a second electrode of the ninth transistor is connected to the second light-emitting control sub-circuit, and a control electrode of the ninth transistor is connected to the signal output terminal.

In some embodiments, the second light-emitting control sub-circuit includes a tenth transistor and switching characteristics of the tenth transistor are the same as switching characteristics of the second transistor; and a first electrode of the tenth transistor is connected to the light-emitting time control sub-circuit, a second electrode of the tenth transistor is connected to the light-emitting device to be driven, and a control electrode of the tenth transistor is connected to a light-emitting control terminal.

In some embodiments, the light-emitting device to be driven includes any one of an LED, an OLED, a micro LED, and a mini LED.

The embodiment of the present disclosure provides a display apparatus, which includes the pixel driving circuit in any one of the above embodiments.

DETAIL DESCRIPTION OF EMBODIMENTS

Figure 1:
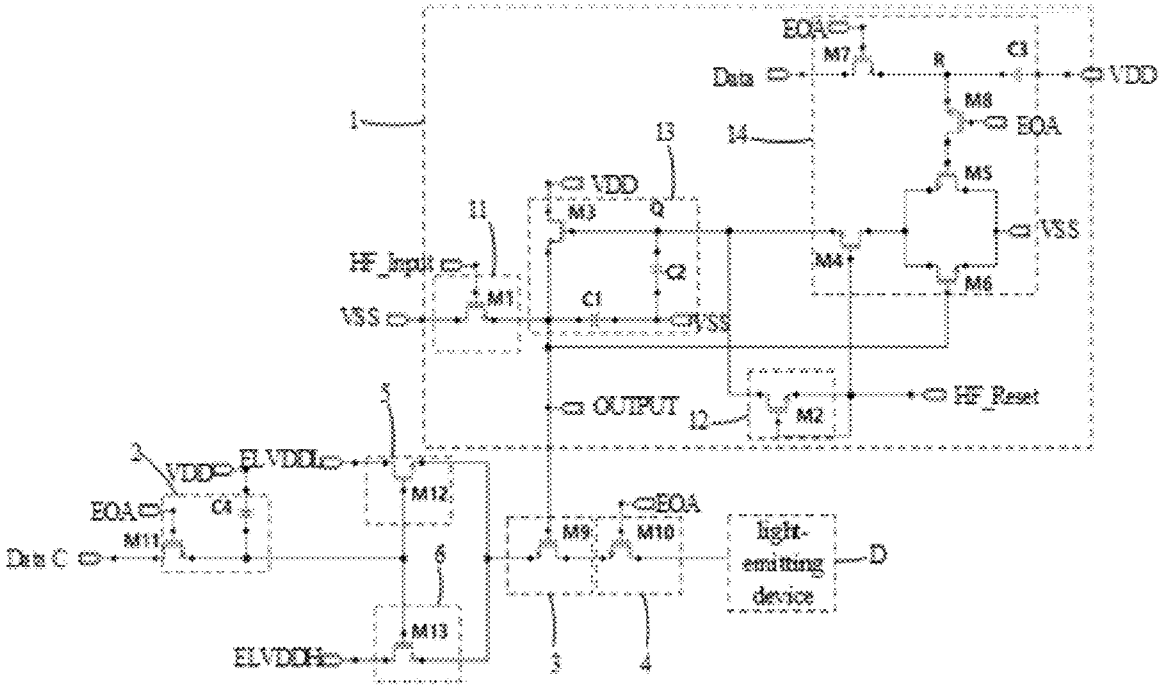
FIG. 1 is a schematic diagram of a pixel driving circuit according to a first example of an embodiment of the present disclosure.

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

In order to describe the embodiments of the present disclosure, it should be noted that in the embodiments of the present disclosure, a first power voltage is greater than a second power voltage. For example: the first power voltage is 8V and the second power voltage is −8V. That is, the first power voltage is a high level signal compared to the second power voltage, and the second power voltage is a low level signal compared to the first power voltage. However, a first power voltage terminal and a second power voltage terminal in the embodiments described below are used to supply the first power voltage and the second power voltage, respectively. An input control signal and a reset signal in the embodiments described below are both high frequency scan signals.

In a first aspect, the embodiment of the present disclosure provides a pixel driving circuit, which includes a gate driving sub-circuit, a first light-emitting control sub-circuit, a second light-emitting control sub-circuit, a first voltage control sub-circuit, a second voltage control sub-circuit, and a light-emitting time control sub-circuit. The gate driving sub-circuit is configured to output a gate driving signal with an adjustable duty ratio. The first light-emitting control sub-circuit is configured to control the first voltage control sub-circuit to output a first light-emitting voltage by a data voltage signal or control the second voltage control sub-circuit to output a second light-emitting voltage by the data voltage signal in response to a light-emitting control signal. The light-emitting time control sub-circuit is configured to output the first light-emitting voltage or the second light-emitting voltage received by the light-emitting time control sub-circuit. The second light-emitting control sub-circuit is configured to output the received first light-emitting voltage or the received second light-emitting voltage to a light-emitting device to be driven under the control of the light-emitting control signal. It should be noted that the first light-emitting voltage and the second light-emitting voltage correspond to different gray scales in different ranges displayed by the light-emitting device. The first light-emitting voltage corresponds to a low gray scale range (gray scales in a low range having a low value) and the second light-emitting voltage corresponds to a high gray scale range (gray scales in a high range having a high value).

In the embodiment of the present disclosure, the gate driving sub-circuit may specifically include an input module, a reset module, a duty ratio adjusting module, and an output module. A connecting node between the output module and the duty ratio adjusting module is a first node. The input module is configured to control a signal output terminal to output a first power voltage or a second power voltage in response to an input control signal. The reset module is configured to reset the first node through a reset signal in response to the reset signal. The duty ratio adjusting module is configured to control a potential at the first node through a data voltage control signal in response to the light-emitting control signal. The output module is configured to output the gate driving signal with a corresponding duty ratio through a signal output terminal in response to the potential at the first node; wherein a potential of the gate driving signal jumps between the first power voltage and the second power voltage (is switched from the first power voltage to the second power voltage or from the second power voltage to the first power voltage).

The duty ratio adjusting module in the gate driving sub-circuit of the pixel driving circuit in the embodiment of the present disclosure may control the potential at the first node through the data voltage control signal under the control of the light-emitting control signal, so as to control a duration of the output module outputting an active level, that is, to adjust a duty ratio of a gate signal output by the output module. At the same time, the first light-emitting control module in the pixel driving circuit controls the first voltage control sub-circuit to output the first light-emitting voltage, or controls the second light-emitting control sub-circuit to output the second light-emitting voltage, and controls the second light-emitting control sub-circuit to operate through the light-emitting control signal according to the data voltage signal, so as to output the first light-emitting voltage or the second light-emitting voltage to the light-emitting device to be driven, thereby displaying a corresponding gray scale. The pixel driving circuit according to the embodiment of the present disclosure is described below with reference to specific examples.

In a first example, FIG. 1 is a schematic diagram of a pixel driving circuit according to a first example of an embodiment of the present disclosure. As shown in FIG. 1, in this example, the input module 11 in the pixel driving sub-circuit includes a first transistor M1; the reset module 12 includes a second transistor M2; the output module 13 includes a third transistor M3, a first storage capacitor C1 and a second storage capacitor C2; the duty ratio adjusting module 14 includes a fourth transistor M4, a fifth transistor M5, a sixth transistor M6, a seventh transistor M7, an eighth transistor M8, and a third storage capacitor C3. The switching characteristics of the first transistor M1, the third transistor M3, the fourth transistor M4 and the seventh transistor M7 are the same. The switching characteristics of the second transistor M2 are opposite to those of the first transistor M1, and are the same as those of the fifth transistor M5, the sixth transistor M6, and the eighth transistor M8. In this example, as an example, the first transistor M1, the third transistor M3, the fourth transistor M4, and the seventh transistor M7 are all P-type transistors, and the second transistor M2, the fifth transistor M5, the sixth transistor M6, and the eighth transistor M8 are all N-type transistors.

Specifically, a first electrode of the first transistor M1 is connected to the second power voltage terminal, a second electrode of the first transistor M1 is connected to a second electrode of the third transistor M3, a first terminal of the first storage capacitor C1 and the signal output terminal OUTPUT, and a control electrode of the first transistor M1 is connected to an input signal control terminal HF_Input. A first electrode of the second transistor M2 is connected to a first node Q, and a second electrode of the second transistor M2 is connected to a control electrode of the second transistor M2 and a reset signal terminal HF_Reset. A first electrode of the third transistor M3 is connected to the first power voltage terminal, the second electrode of the third transistor M3 is connected to the signal output terminal OUTPUT and the first terminal of the first storage capacitor C1, and a control electrode of the third transistor M3 is connected to the first node Q. A second terminal of the first storage capacitor C1 is connected to a second terminal of the second storage capacitor C2 and the second power voltage terminal, and a first terminal of the second storage capacitor C2 is connected to the first node Q. A first electrode of the fourth transistor M4 is connected to the first node Q, a second electrode of the fourth transistor M4 is connected to a first electrode of the fifth transistor M5 and a first electrode of the sixth transistor M6, and a control electrode of the fourth transistor M4 is connected to the reset signal terminal HF_Reset. A second electrode of the fifth transistor M5 is connected to a second electrode of the sixth transistor M6 and the second power voltage terminal, and a control electrode of the fifth transistor M5 is connected to a second electrode of the eighth transistor M8. A control electrode of the sixth transistor M6 is connected to the signal output terminal OUTPUT. A first electrode of the seventh transistor M7 is connected to a data voltage control signal terminal Data, a second electrode of the seventh transistor M7 is connected to a first terminal of the third storage capacitor C3 and a first electrode (i.e., a second node R) of the eighth transistor M8, and a control electrode of the seventh transistor M7 is connected to a light-emitting control signal terminal EOA. A control electrode of the eighth transistor M8 is connected to the light-emitting control signal terminal EOA. A second terminal of the third storage capacitor C3 is connected to the first power voltage terminal.

By only taking an example in which the first power voltage is 8V, and the second power voltage is −8V; a timing of the first light-emitting voltage includes a high level signal of 12V, a low level signal of −12V, a period H=1000 μs, and a duty ratio of the low level signal/the high level signal=5 μs/995 μs; a timing of the second light-emitting voltage includes a high level signal of 12V, a low level signal of −12V, a period H=1000 μs, and a duty ratio of the high level signal/the low level signal=5 μs/995 μs; a timing of the reset signal includes a high level signal of 20V, a low level signal of −12V, a period H=1000 μs, and a duty ratio of the low level signal/the high level signal=995 μs/5 μs; the data voltage control signal is Datastep=[−6.65V, −6.92V], both of the first storage capacitor and the third storage capacitor C3 have a capacitance of 50 fF, and the second storage capacitor has a capacitance of 500 fF, the gate driving sub-circuit 1 of the pixel driving circuit in the first example is simulated. It should be understood that the above parameters may be adjusted according to actual requirements in an actual application of a product.

A method of generating the gate driving signal of the gate driving sub-circuit 1 of the pixel driving circuit will be described below. The method specifically includes a first stage to a fourth stage:

In a first stage, the reset signal written by the reset signal terminal HF_Reset is a high level signal, so that the second transistor M2 is turned on, the fourth transistor M4 is turned off, the potential at the first node Q is reset to 20V, and therefore, the third transistor M3 is turned off.

In a second stage, the reset signal written by the reset signal terminal HF_Reset is a low level signal, so that the second transistor M2 is turned off, the fourth transistor M4 is turned on; the input control signal written by the input signal control terminal HF_Input is a low level signal, so that the first transistor M1 is turned on, the second power voltage is written to the first storage capacitor C1, the signal output terminal OUTPUT outputs a low level signal, and the sixth transistor M6 is turned off. A low level signal is written by the light-emitting control signal terminal EOA, so that the seventh transistor M7 is turned on, the data voltage control signal is written in the second node R and the third storage capacitor C3; a high level signal is written by the light-emitting control signal terminal EOA, so that the eighth transistor M8 is turned on, and a magnitude of a saturation current Id of the fifth transistor M5 is controlled by a potential at the second node R, thereby controlling a discharging speed of the first node Q.

In a third stage, after time t, through discharging, a difference of the voltage at the first node Q minus the first power voltage (i.e., the difference is a gate-source voltage Vgs of the third transistor M3) is less than a threshold voltage Vth of the third transistor M3, i.e., VQ−VDD<Vth, so that the first power voltage written by the first power voltage terminal is written to the first storage capacitor C1, the signal output terminal OUTPUT outputs a high level signal, and therefore, the sixth transistor M6 is turned on, and the voltage at the first node Q is quickly discharged to the second power voltage.

In a fourth stage, the reset signal written by the reset signal terminal HF_Reset is a high level signal, so that the second transistor M2 is turned on, the fourth transistor M4 is turned off, the potential at the first node Q is reset to 20V, and therefore, the third transistor M3 is turned off, the first storage capacitor C1 maintains a high level, and the signal output terminal OUTPUT continues to output a high level signal.

The second stage to the fourth stage are repeated in a next period.

It can be seen that the data voltage control signal is written to the control electrode of the fifth transistor M5, and the discharging speed of the first node Q is controlled by controlling the saturation current Id of the fifth transistor M5, and the duration t required for the first node Q to be discharged to VQ−VDD<Vth is a duration of a low level signal in a clock period of a clock signal. By adjusting the voltage of the data voltage control signal, output gate driving signals with different duty ratios can be obtained.

Next, with continued reference to FIG. 1, in this example, the light-emitting time control sub-circuit 3 in the pixel driving circuit includes a ninth transistor M9, the second light-emitting control sub-circuit 4 includes a tenth transistor M10, the first light-emitting control sub-circuit 2 includes an eleventh transistor M11 and a fourth storage capacitor C4, a first light-emitting voltage control sub-circuit 5 includes a twelfth transistor M12, and a second light-emitting voltage control sub-circuit 6 includes a thirteenth transistor M13. The switching characteristics of the ninth transistor M9, the tenth transistor M10 and the twelfth transistor M12 are the same, and are the same as that of the second transistor, that is, the ninth transistor M9, the tenth transistor M10 and the twelfth transistor M12 are N-type transistors. The switching characteristics of the eleventh transistor M11 and the thirteenth transistor M13 are the same, and are different from that of the ninth transistor M9, that is, the eleventh transistor M11 and the thirteenth transistor M13 are P-type transistors.

Specifically, a first electrode of the ninth transistor M9 is connected to a second electrode of the twelfth transistor M12 and a second electrode of the thirteenth transistor M13, a second electrode of the ninth transistor M9 is connected to a first electrode of the tenth transistor M10, and a control electrode of the ninth transistor M9 is connected to the signal output terminal OUTPUT. A second electrode of the tenth transistor M10 is connected to a first electrode of the light-emitting device D to be driven, and a control electrode of the tenth transistor M10 is connected to the light-emitting control signal terminal EOA. A first electrode of the eleventh transistor M11 is connected to a data voltage signal terminal Data C, a second electrode of the eleventh transistor M11 is connected to a first terminal of the fourth storage capacitor C4, and a control electrode of the eleventh transistor M11 is connected to the light-emitting control signal terminal EOA. A second terminal of the fourth storage capacitor C4 is connected to the first power voltage terminal. A first electrode of the twelfth transistor M12 is connected to a first light-emitting voltage terminal, and a control electrode of the twelfth transistor M12 is connected to a control electrode of the thirteenth transistor M13, the second electrode of the eleventh transistor M11 and the first terminal of the fourth storage capacitor C4. A first electrode of the thirteenth transistor M13 is connected to a second light-emitting voltage terminal.

A method for driving a pixel driving circuit according to the embodiment of the present disclosure will be described below in conjunction with generation of the gate driving signal of the gate driving sub-circuit 1 of the pixel driving circuit. The method for driving a pixel driving circuit may specifically include a data voltage writing stage and a light-emitting stage.

In a data voltage writing stage, a low level signal is written to the light-emitting control signal terminal EOA, so that the seventh transistor M7 is turned on, the eighth transistor M8 is turned off, and a data control voltage is written to the second node R and stored in the third storage capacitor C3.

In a light-emitting stage, a high level signal is written to the light-emitting control signal terminal EOA, so that the seventh transistor M7 is turned off, the eighth transistor M8 is turned on, the saturation current Id of the fifth transistor M5 is controlled by a potential at the second node R, the discharging speed of the first node Q is controlled, and thus the duty ratio of the gate driving signal output by the signal output terminal OUTPUT is controlled. When the gate driving signal is a high level and a signal input from the light-emitting control signal terminal EOA is a high level signal, the ninth transistor M9 and the tenth transistor M10 are turned on. The light-emitting is stopped when a low level signal is written to the light-emitting control signal terminal EOA. In the light-emitting stage, according to a gray scale to be displayed, a corresponding data voltage signal is written to the data voltage signal terminal Data C, and controls one of the first light-emitting voltage and the second light-emitting voltage to be output to the light-emitting device D to be driven.

Specifically, a formula of a proportional relation between brightness at any gray scale (an Nth gray scale) and brightness at a 255th gray scale is as follows:

$$\text{Brightness at an } N\text{th gray scale} = \text{brightness at a 255th gray scale} \times (N/255)^{gamma}$$

When the driving is performed by using the gate driving signal with the duty ratio, a duty ratio at the Nth gray scale is as follows:

$$\text{Duty ratio at an } N\text{th gray scale} = \text{duty ratio at a 255th gray scale} \times (N/255)^{gamma}$$

Given that the duty ratio at the 255th gray scale is 100%, that is, the light-emitting device D is always operating through the 1H display period, the duty ratios at the other gray scales may be calculated by the above formula. For example, a duty ratio at a first gray scale is 0.0005%, and a duty ratio at a 23th gray scale is 0.5%. It may be known that the duty ratio at the first gray scale (that is, the brightness) is 1/1000 of that at the 23th gray scale.

When displaying at gray scales in the high range, a low level signal is written to the data voltage signal terminal Data C, so that the thirteenth transistor M13 is turned on, the second light-emitting voltage (a high voltage) is written to the light-emitting device D to be driven, the maximum brightness is the brightness at the 255th gray scale, and the display of different gray scales of the gray scales in the high range is realized by adjusting the duty ratio of the gate driving signal output by the signal output terminal OUTPUT. However, in the gate driving sub-circuit 1, the lowest duty ratio of 0.1% (at eleventh gray scale) can be realized, and the duty ratios at first to tenth gray scales (at gray scales in the low range) cannot be realized.

When displaying at the first to tenth gray scales (at the gray scales in the low range), a high voltage is written to the data voltage signal terminal Data C, so that the twelfth transistor M12 is turned on, the first light-emitting voltage (a low voltage) is written to the light-emitting device D to be driven, the maximum brightness is the brightness at the 23th gray scale (that is, when the duty ratio of the signal output by the signal output terminal OUTPUT is 100%). In this case, when the duty ratio of the gate driving signal output by the signal output terminal OUTPUT is adjusted to be 0.1%, the brightness is 1/1000 of that at the 23th gray scale. Therefore, the display at the first gray scale can be achieved, and similarly, the display at 2nd to 22nd gray scales can be achieved.

Figure 2:
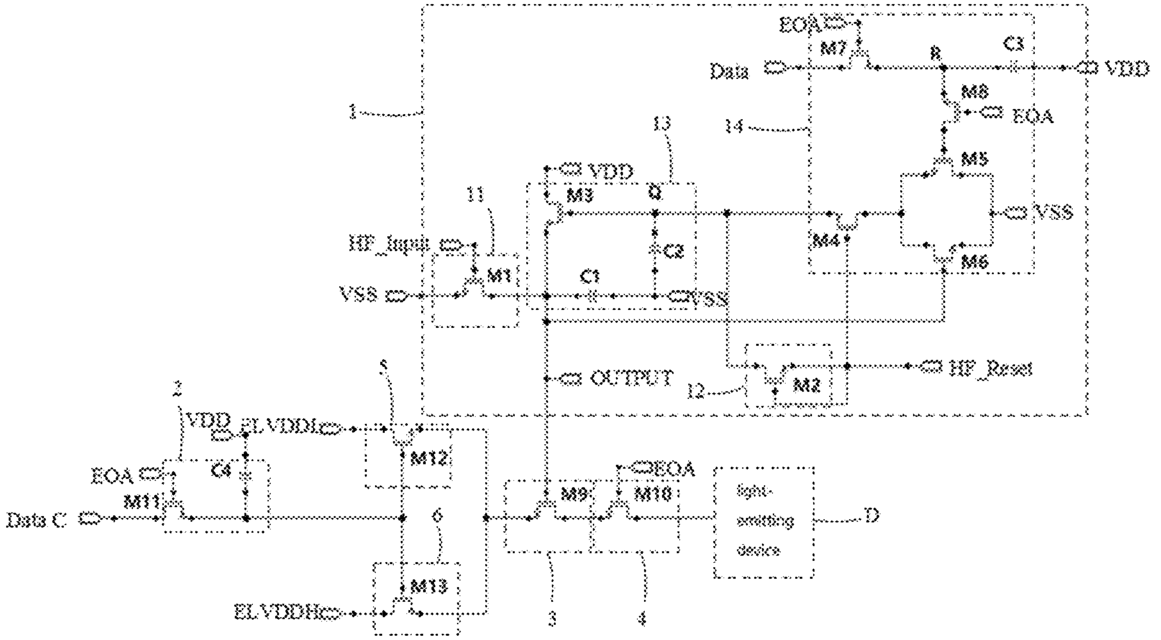
FIG. 2 is a schematic diagram of a pixel driving circuit according to a second example of an embodiment of the present disclosure.

In a second example, FIG. 2 is a schematic diagram of a pixel driving circuit according to a second example of an embodiment of the present disclosure. As shown in FIG. 2, the pixel driving circuit in this example is substantially the same as that in the first example, except that the first transistor M1 in the input module 11 of the pixel driving circuit is an N-type transistor in the second example. Due to a parasitic capacitance of the first transistor M1, the signal output from the signal output terminal OUTPUT is pulled up when the first transistor M1 as a P-type transistor is turned off, which may cause the leakage of the sixth transistor M6. When the first transistor M1 as an N-type transistor is turned off, the output signal from the signal output terminal OUTPUT is pulled down, thereby preventing the leakage of the sixth transistor M6.

The remaining structures in the second example are the same as those in the first example, and the method for driving the pixel driving circuit is also the same as that in the first example, and therefore, the description is not repeated here. It should be noted that the first transistor M1 is a P-type transistor, and the timing signal input by the input signal control terminal HF_Input is HF_InputL in the first example, and the first transistor M1 is an N-type transistor, and the timing signal input by the input signal control terminal HF_Input is HF_InputH in the second example, where the timing of HF_InputH is opposite to that of HF_InputL.

Figure 3:
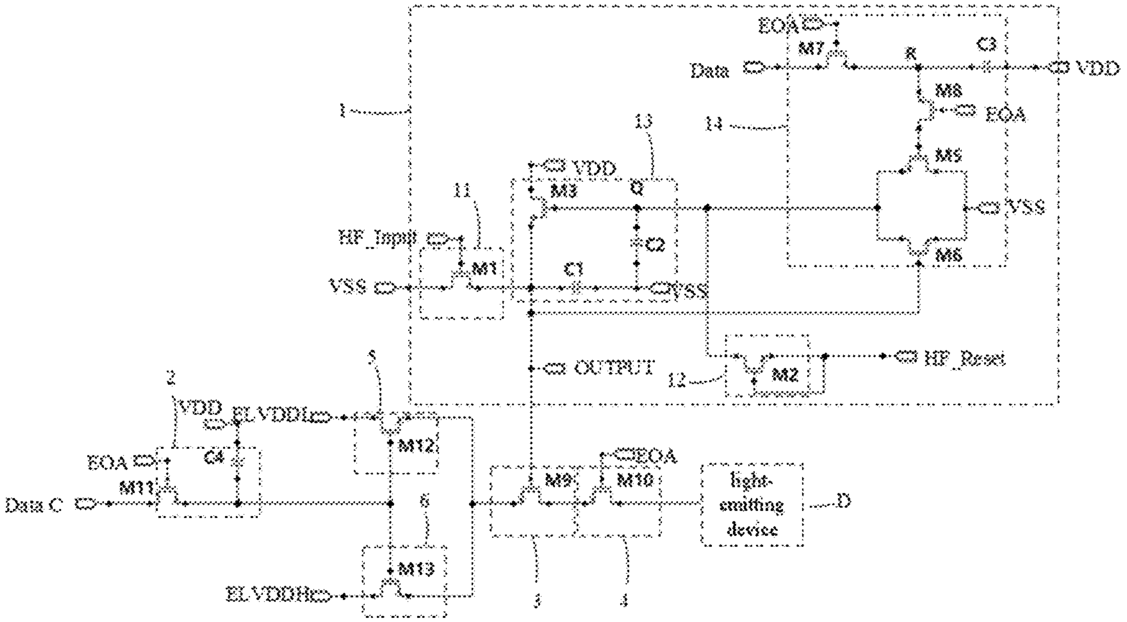
FIG. 3 is a schematic diagram of a pixel driving circuit according to a third example of an embodiment of the present disclosure.

In a third example: FIG. 3 is a schematic diagram of a pixel driving circuit according to a third example of an embodiment of the present disclosure. As shown in FIG. 3, the pixel driving circuit in this example is substantially the same as that in the first example, except that in the third example, the duty ratio adjusting module 14 of the pixel driving circuit does not include the fourth transistor M4, and only includes the fifth transistor M5, the sixth transistor M6, the seventh transistor M7, the eighth transistor M8 and the third storage capacitor C3. The pixel driving circuit in this example does not include the fourth transistor M4 as in the pixel driving circuit in the first example, but which does not affect the output of the signal output terminal OUTPUT. The pixel driving circuit has a relatively small number of transistors, thereby contributing to a high resolution and a high aperture ratio of the display panel.

The remaining structures in the third example are the same as those in the first example, and the method for driving a pixel driving circuit is also the same as that in the first example, and therefore, the description is not repeated here.

Figure 4:
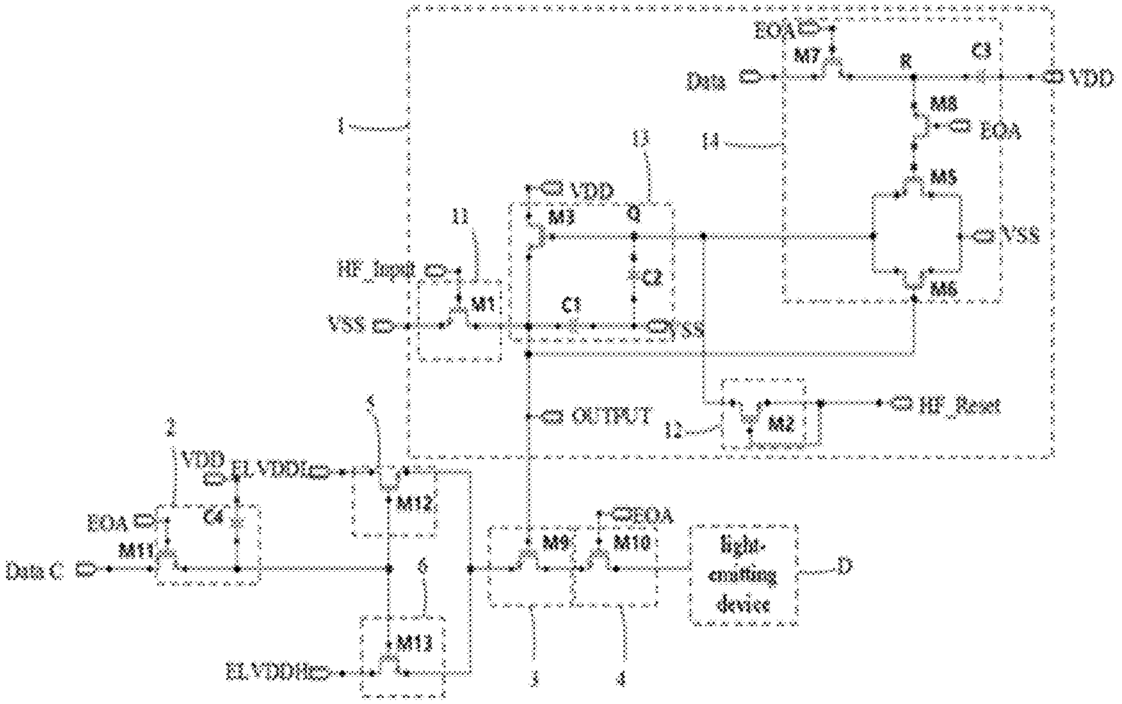
FIG. 4 is a schematic diagram of a pixel driving circuit according to a fourth example of an embodiment of the present disclosure.

In a fourth example, FIG. 4 is a schematic diagram of a pixel driving circuit according to a fourth example of an embodiment of the present disclosure. As shown in FIG. 4, the pixel driving circuit in this example is substantially the same as that in the third example, except that in the fourth example, the first transistor M1 in the input module 11 of the pixel driving circuit is an N-type transistor. Due to a parasitic capacitance of the first transistor M1, the signal output from the signal output terminal OUTPUT is pulled up when the first transistor M1 as a P-type transistor is turned off, which may cause the leakage of the sixth transistor M6. When the first transistor M1 as an N-type transistor is turned off, the output signal from the signal output terminal OUTPUT is pulled down, thereby preventing the leakage of the sixth transistor M6. It should be noted that the first transistor M1 is a P-type transistor, and the timing signal input by the input signal control terminal HF_Input is HF_InputL in the third example, and the first transistor M1 is an N-type transistor, and the timing signal input by the input signal control terminal HF_Input is HF_InputH in the fourth example, where the timing of HF_InputH is opposite to that of HF_InputL.

Figure 5:
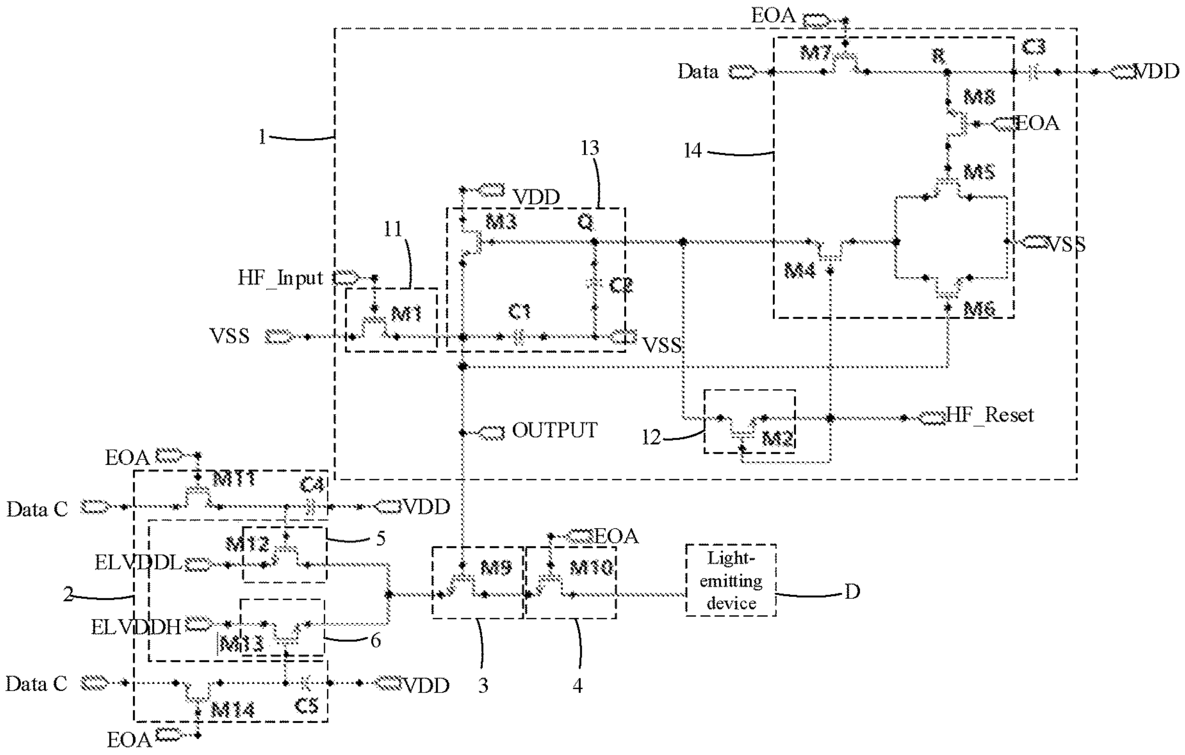
FIG. 5 is a schematic diagram of a pixel driving circuit according to a fifth example of an embodiment of the present disclosure.

In a fifth example: FIG. 5 is a schematic diagram of a pixel driving circuit according to a fifth example of an embodiment of the present disclosure. As shown in FIG. 5, the pixel driving circuit in this example is substantially the same as that in the first example, except that the first light-emitting control sub-circuit 2 is different. The first light-emitting control sub-circuit 2 includes an eleventh transistor M11, a fourteenth transistor M14, a fourth storage capacitor C4, and a fifth storage capacitor. The switching characteristics of the eleventh transistor M11 are opposite to those of the second transistor M2, and are the same as those of the fourteenth transistor M14. That is, both the eleventh transistor M11 and the fourteenth transistor M14 are P-type transistors.

Specifically, a first electrode of the eleventh transistor M11 is connected to a data signal terminal, a second electrode of the eleventh transistor M11 is connected to a first terminal of the fourth storage capacitor C4 and a control electrode of the twelfth transistor M12, and a control electrode of the eleventh transistor M11 is connected to the light-emitting control signal terminal EOA. A second terminal of the fourth storage capacitor C4 is connected to the first power voltage terminal. A first electrode of the fourteenth transistor M14 is connected to the data signal terminal, a second electrode of the fourteenth transistor M14 is connected to a first terminal of the fifth storage capacitor, a control electrode of the thirteenth transistor M13, and a control electrode of the fourteenth transistor M14 is connected to the light-emitting control signal terminal EOA. A second terminal of the fifth storage capacitor is connected to the first power voltage terminal.

It can be seen that the control electrode of the twelfth transistor M12 connected to the first light-emitting control sub-circuit 2 is controlled by the output of the eleventh transistor M11, the control electrode of the thirteenth transistor M13 connected to the second light-emitting control sub-circuit is controlled by the output of the fourteenth transistor M14, and the first electrode of the twelfth transistor M12 is connected to the first light-emitting voltage terminal, the first electrode of the thirteenth transistor M13 is connected to the second light-emitting voltage terminal, and the eleventh transistor M11 and the fourteenth transistor M14 both output the same data voltage signal when turned on, so that the twelfth transistor M12 and the fourteenth transistor M14 may be transistors having the same switching characteristics. In the light-emitting stage, different light-emitting voltages are written to the first electrodes of the twelfth transistor M12 and the thirteenth transistor M13, so that only one of the twelfth transistor M12 and the thirteenth transistor M13 is turned on to control the light-emitting device D to be driven to emit light. That is, the twelfth transistor M12 and the thirteenth transistor M13 may be both P-type transistors or both N-type transistors. Preferably, the twelfth transistor M12 and the thirteenth transistor M13 are transistors having the same switching characteristics as the eleventh transistor M11 and the fourteenth transistor M14, that is, P-type transistors, so as to be easily formed.

The remaining structures of the pixel driving circuit in the fifth example are the same as those in the first example, and therefore are not described again. The gate driving sub-circuit 1 in the pixel driving circuit in the fifth example is the same as that in the first example, the method of generating the gate driving signal in the fifth example is also the same as that in the first example, and thus is not repeated.

A method for driving a pixel driving circuit according to the embodiment of the present disclosure will be described below in conjunction with generation of the gate driving signal of the gate driving sub-circuit 1 of the pixel driving circuit in the first example. The method for driving a pixel driving circuit may specifically include a data voltage writing stage.

In the data voltage writing stage, a low level signal is written to the light-emitting control signal terminal EOA, so that the seventh transistor M7 is turned on, the eighth transistor M8 is turned off, and a data control voltage is written to the second node R and stored in the third storage capacitor C3. The eleventh transistor M11 and the fourteenth transistor M14 are turned on, and data voltage signals are written to the control electrode of the twelfth transistor M12 and the fourth storage capacitor C4, and the control electrode of the thirteenth transistor M13 and the fifth storage capacitor, respectively. The data voltage signal controls one of the first light-emitting voltage and the second light-emitting voltage to be written to the first electrode of the light-emitting device D to be driven. If the twelfth transistor M12 is turned on by the data voltage signal, the first light-emitting voltage participates in the light-emitting to realize the display at the gray scales in the low range, and if the thirteenth transistor M13 is turned on by the data voltage signal, the second light-emitting voltage participates in the light-emitting to realize the display at the gray scales in the high range.

When displaying at gray scales in the high range, a low level signal is written to the data voltage signal terminal Data C, so that the thirteenth transistor M13 is turned on, the second light-emitting voltage (a high voltage) is written to the light-emitting device D to be driven, the maximum brightness is the brightness at the 255th gray scale, and the display of different gray scales of the gray scales in the high range is realized by adjusting the duty ratio of the gate driving signal output by the signal output terminal OUTPUT. However, in the gate driving sub-circuit 1, the lowest duty ratio of 0.1% (at eleventh gray scale) can be realized, and the duty ratios at first to tenth gray scales (at gray scales in the low range) cannot be realized.

When displaying at the first to tenth gray scales (at the gray scales in the low range), a high voltage is written to the data voltage signal terminal Data C, so that the twelfth transistor M12 is turned on, the first light-emitting voltage (a low voltage) is written to the light-emitting device D to be driven, the maximum brightness is the brightness at the 23th gray scale (that is, when the duty ratio of the signal output by the signal output terminal OUTPUT is 100%). In this case, when the duty ratio of the gate driving signal output by the signal output terminal OUTPUT is adjusted to be 0.1%, the brightness is 1/1000 of that at the 23th gray scale. Therefore, the display at the first gray scale can be achieved, and similarly, the display at 2nd to 22nd gray scales can be achieved.

Referring to FIG. 5, by writing different data voltage control signals, the duty ratio of the gate driving signal output by the signal output terminal OUTPUT may be adjusted, so as to realize the display at the gray scales in the high range and in the low range by matching with the first light-emitting voltage and the second light-emitting voltage.

Figure 6:
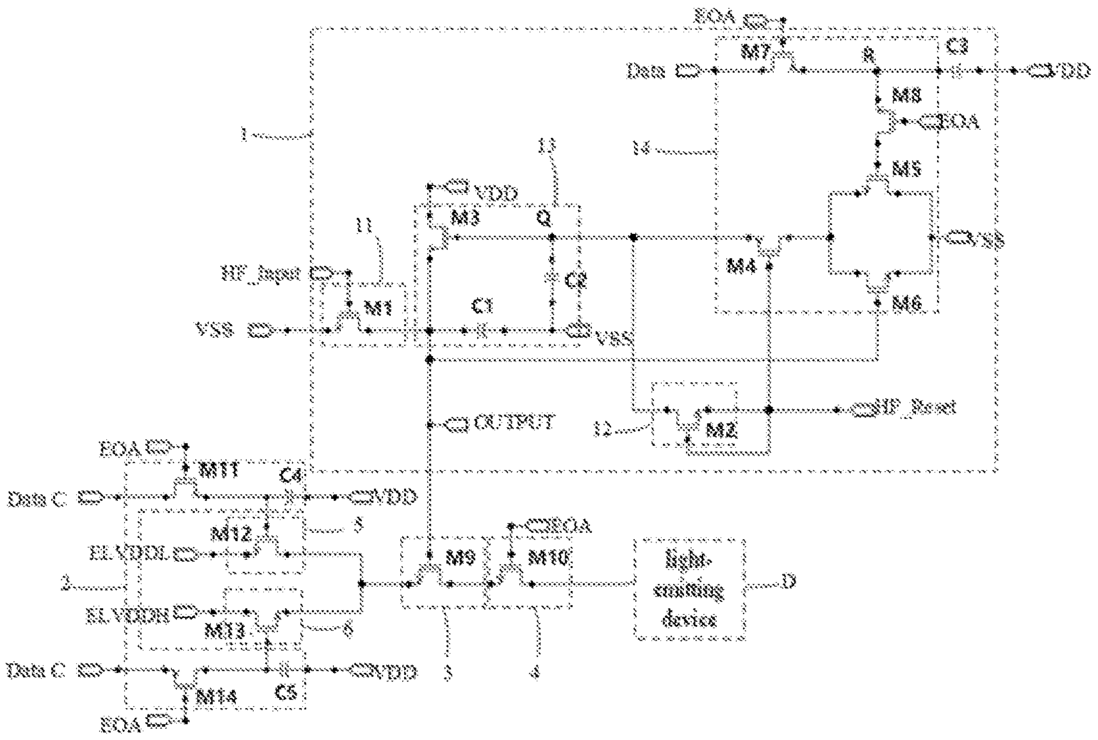
FIG. 6 is a schematic diagram of a pixel driving circuit according to a sixth example of an embodiment of the present disclosure.

In a sixth example: FIG. 6 is a schematic diagram of a pixel driving circuit according to a sixth example of an embodiment of the present disclosure. As shown in FIG. 6, the pixel driving circuit in this example is substantially the same as that in the fifth example, only except that the first transistor M1 in the input module 11 of the pixel driving circuit is an N-type transistor in the sixth example. Due to a parasitic capacitance of the first transistor M1, the signal output from the signal output terminal OUTPUT is pulled up when the first transistor M1 as a P-type transistor is turned off, which may cause the leakage of the sixth transistor M6. When the first transistor M1 as an N-type transistor is turned off, the output signal from the signal output terminal OUTPUT is pulled down, thereby preventing the leakage of the sixth transistor M6. It should be noted that the first transistor M1 is a P-type transistor, and the timing signal input by the input signal control terminal HF_Input is HF_InputL in the fifth example, and the first transistor M1 is an N-type transistor, and the timing signal input by the input signal control terminal HF_Input is HF_InputH in the sixth example, where the timing of HF_InputH is opposite to that of HF_InputL.

The remaining structures in the sixth example are the same as those in the fifth example, and the method for driving a pixel driving circuit is also the same as that in the fifth example, and therefore, the description is not repeated here.

Figure 7:
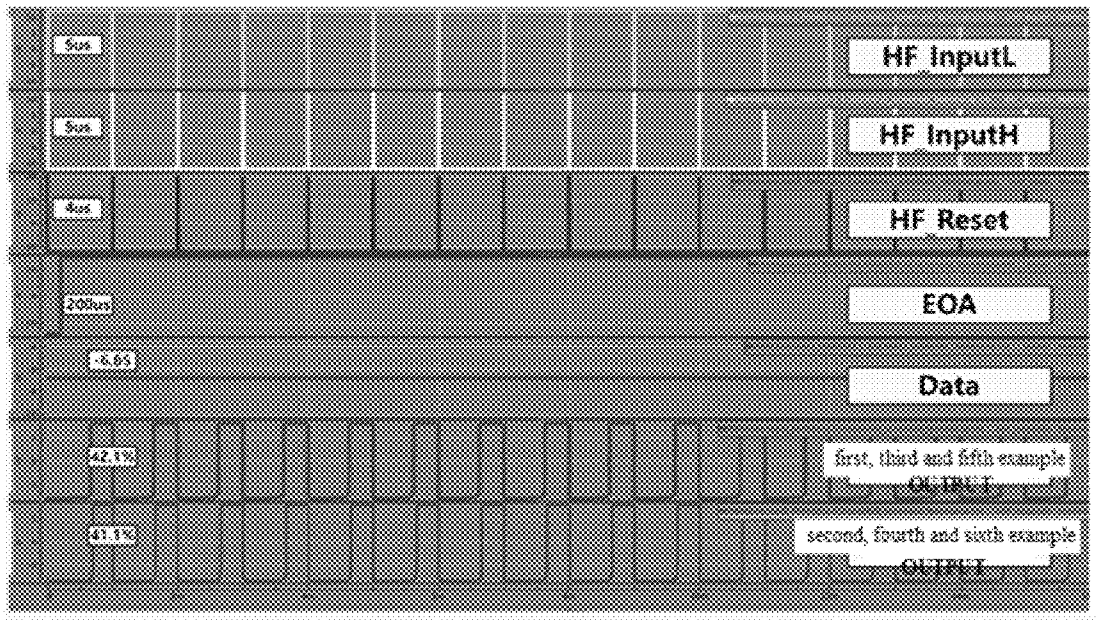
FIGS. 7 and 8 are simulation diagrams of outputs at a signal output terminal of a gate driving sub-circuit of the pixel driving circuit under different data voltage control signals according to the first example to the sixth example of the embodiment of the present disclosure.
Figure 8:
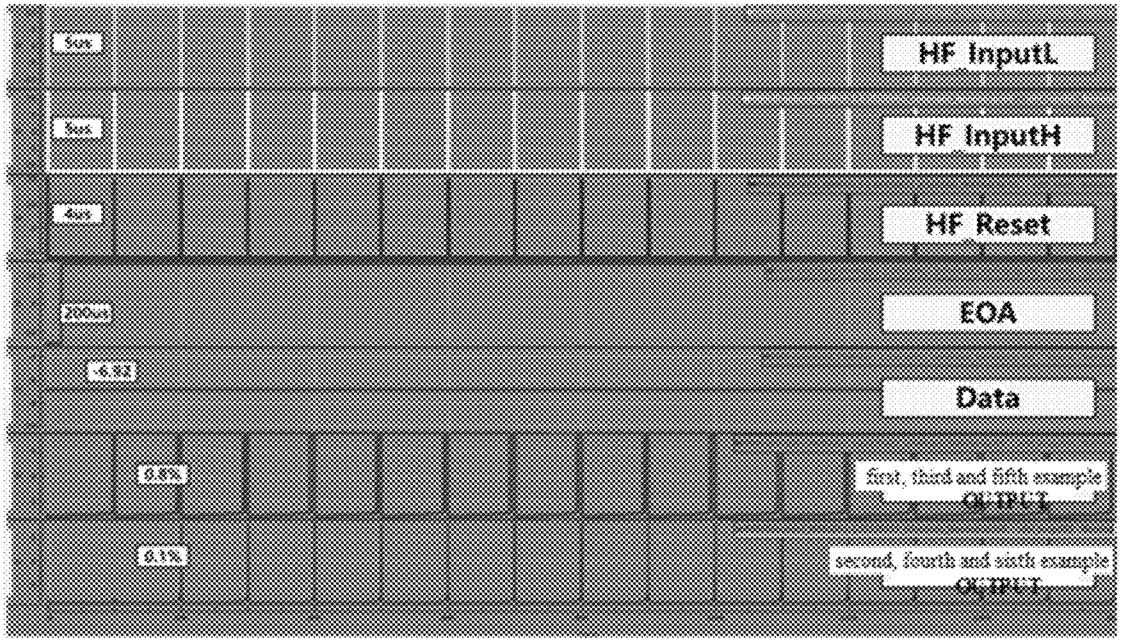

FIGS. 7 and 8 are simulation diagrams of outputs at a signal output terminal OUTPUT of a gate driving sub-circuit 1 of the pixel driving circuit under different data control voltages according to the first example to the sixth example of the embodiment of the present disclosure. As shown in FIGS. 7 and 8, by writing different data voltage control signals, the duty ratio of the gate driving signal output by the signal output terminal OUTPUT may be adjusted, so as to realize the display at the gray scales in the high range and in the low range by matching with the first light-emitting voltage and the second light-emitting voltage.

Figure 9:
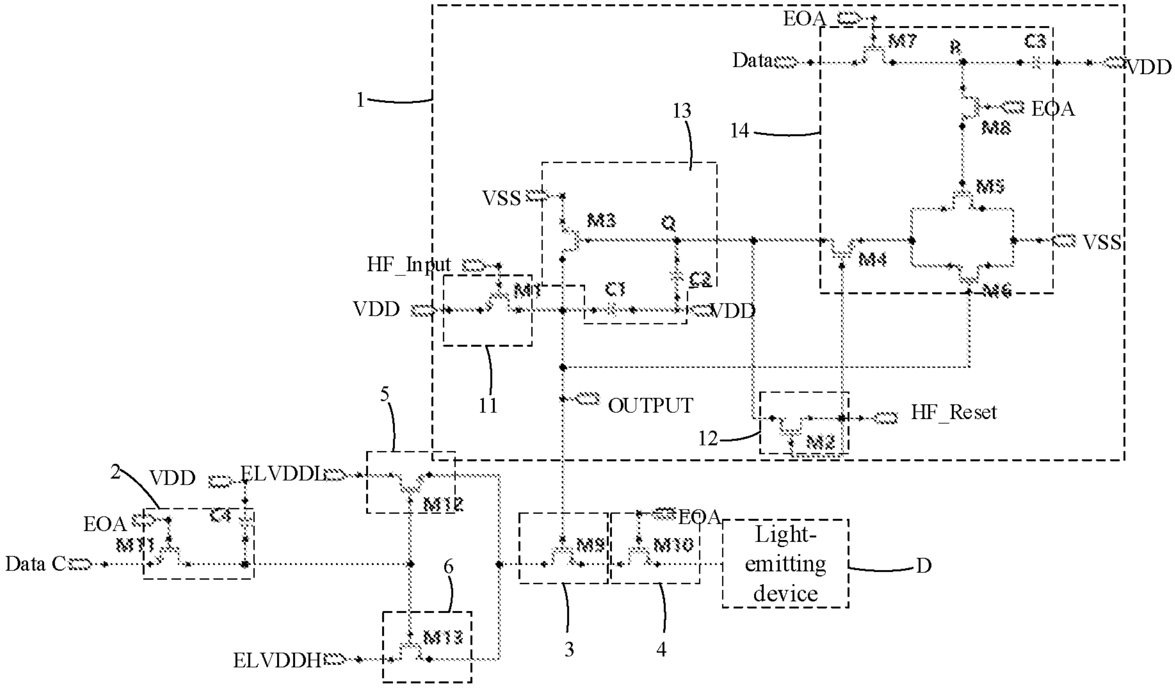
FIG. 9 is a schematic diagram of a pixel driving circuit according to a seventh example of an embodiment of the present disclosure.

In a seventh example: FIG. 9 is a schematic diagram of a pixel driving circuit according to a seventh example of an embodiment of the present disclosure. As shown in FIG. 9, in this example, the input module 11 in the pixel driving sub-circuit includes a first transistor M1; the reset module 12 includes a second transistor M2; the output module 13 includes a third transistor M3, a first storage capacitor C1 and a second storage capacitor C2; the duty ratio adjusting module 14 includes a fourth transistor M4, a fifth transistor M5, a sixth transistor M6, a seventh transistor M7, an eighth transistor M8, and a third storage capacitor C3. The switching characteristics of the first transistor M1, the third transistor M3, the fourth transistor M4 and the seventh transistor M7 are the same. The switching characteristics of the second transistor M2 are opposite to those of the first transistor M1, and are the same as those of the fifth transistor M5, the sixth transistor M6, and the eighth transistor M8. In this example, as an example, the first transistor M1, the third transistor M3, the fourth transistor M4, and the seventh transistor M7 are all P-type transistors, and the second transistor M2, the fifth transistor M5, the sixth transistor M6, and the eighth transistor M8 are all N-type transistors.

Specifically, a first electrode of the first transistor M1 is connected to the first power voltage terminal, a second electrode of the first transistor M1 is connected to a second electrode of the third transistor M3, a first terminal of the first storage capacitor C1 and the signal output terminal OUTPUT, and a control electrode of the first transistor M1 is connected to an input signal control terminal HF_Input. A first electrode of the second transistor M2 is connected to a first node Q, and a second electrode of the second transistor M2 is connected to a control electrode of the second transistor M2 and a reset signal terminal HF_Reset. A first electrode of the third transistor M3 is connected to the second power voltage terminal, the second electrode of the third transistor M3 is connected to the signal output terminal OUTPUT and the first terminal of the first storage capacitor C1, and a control electrode of the third transistor M3 is connected to the first node Q. A second terminal of the first storage capacitor C1 is connected to a second terminal of the second storage capacitor C2 and the first power voltage terminal, and a first terminal of the second storage capacitor C2 is connected to the first node Q. A first electrode of the fourth transistor M4 is connected to the first node Q, a second electrode of the fourth transistor M4 is connected to a first electrode of the fifth transistor M5 and a first electrode of the sixth transistor M6, and a control electrode of the fourth transistor M4 is connected to the reset signal terminal HF_Reset. A second electrode of the fifth transistor M5 is connected to a second electrode of the sixth transistor M6 and the first power voltage terminal, and a control electrode of the fifth transistor M5 is connected to a second electrode of the eighth transistor M8. A control electrode of the sixth transistor M6 is connected to the signal output terminal OUTPUT. A first electrode of the seventh transistor M7 is connected to a data voltage control signal terminal Data, a second electrode of the seventh transistor M7 is connected to a first terminal of the third storage capacitor C3 and a first electrode (i.e., a second node R) of the eighth transistor M8, and a control electrode of the seventh transistor M7 is connected to a light-emitting control signal terminal EOA. A control electrode of the eighth transistor M8 is connected to the light-emitting control signal terminal EOA. A second terminal of the third storage capacitor C3 is connected to the first power voltage terminal.

By only taking an example in which the first power voltage is 8V, and the second power voltage is −8V; a timing of the first light-emitting voltage includes a high level signal of 12V, a low level signal of −12V, a period H=1000 μs, and a duty ratio of the high level signal/the low level signal=5 μs/995 μs; a timing of the second light-emitting voltage includes a high level signal of 12V, a low level signal of −12V, a period H=1000 μs, and a duty ratio of the low level signal/the high level signal=5 μs/995 μs; a timing of the reset signal includes a high level signal of 20V, a low level signal of −12V, a period H=1000 μs, and a duty ratio of the high level signal/the low level signal=996 μs/4 μs; the data voltage control signal is Datastep=[5.6V, 5.85V], both of the first storage capacitor and the third storage capacitor C3 have a capacitance of 50 fF, and the second storage capacitor has a capacitance of 500 fF, the gate driving sub-circuit 1 of the pixel driving circuit in the seventh example is simulated. It should be understood that the above parameters may be adjusted according to actual requirements in an actual application of a product.

A method of generating the gate driving signal of the gate driving sub-circuit 1 of the pixel driving circuit will be described below. The method specifically includes a first stage to a fourth stage:

In a first stage, the reset signal written by the reset signal terminal HF_Reset is a low level signal, so that the second transistor M2 is turned on, the fourth transistor M4 is turned off, the potential at the first node Q is reset to 20V, and therefore, the third transistor M3 is turned off.

In a second stage, the reset signal written by the reset signal terminal HF_Reset is a high level signal, so that the second transistor M2 is turned off, the fourth transistor M4 is turned on; the input control signal written by the input signal control terminal HF_Input is a high level signal, so that the first transistor M1 is turned on, the first power voltage is written to the first storage capacitor C1, the signal output terminal OUTPUT outputs a high level signal, and the sixth transistor M6 is turned off, and the first node Q is charged by the first power voltage. A low level signal is written by the light-emitting control signal terminal EOA, so that the seventh transistor M7 is turned on, the data voltage control signal is written in the second node R and the third storage capacitor C3; a high level signal is written by the light-emitting control signal terminal EOA, so that the eighth transistor M8 is turned on, and a magnitude of a saturation current Id of the fifth transistor M5 is controlled by a potential at the second node R, thereby controlling a charging speed of the first node Q.

In a third stage, after time t, through charging, a difference of the voltage at the first node Q minus the second power voltage (i.e., the difference is a gate-source voltage Vgs of the third transistor M3) is greater than a threshold voltage Vth of the third transistor M3, i.e., VQ−VSS>Vth, so that the second power voltage written by the second power voltage terminal is written to the first storage capacitor C1, the signal output terminal OUTPUT outputs a low level signal, and therefore, the sixth transistor M6 is turned on, and the voltage at the first node Q is quickly charged to the first power voltage.

In a fourth stage, the reset signal written by the reset signal terminal HF_Reset is a low level signal, so that the second transistor M2 is turned on, the fourth transistor M4 is turned off, the potential at the first node Q is reset to 20V, and therefore, the third transistor M3 is turned off, the first storage capacitor C1 maintains a low level, and the signal output terminal OUTPUT continues to output a low level signal.

The second stage to the fourth stage are repeated in a next period.

It can be seen that the data voltage control signal is written to the control electrode of the fifth transistor M5, and the charging speed of the first node Q is controlled by controlling the saturation current Id of the fifth transistor M5, and the duration t required for the first node Q to be discharged to VQ−VSS>Vth is a duration of a high level signal in a clock period of a clock signal. By adjusting the voltage of the data voltage control signal, output gate driving signals with different duty ratios can be obtained.

Next, with continued reference to FIG. 9, in this example, the light-emitting time control sub-circuit 3 in the pixel driving circuit includes a ninth transistor M9, the second light-emitting control sub-circuit 4 includes a tenth transistor M10, the first light-emitting control sub-circuit 2 includes an eleventh transistor M11 and a fourth storage capacitor C4, a first light-emitting voltage control sub-circuit 5 includes a twelfth transistor M12, and a second light-emitting voltage control sub-circuit 6 includes a thirteenth transistor M13. The switching characteristics of the ninth transistor M9, the tenth transistor M10 and the thirteenth transistor M13 are the same, and are the same as that of the second transistor, that is, the ninth transistor M9, the tenth transistor M10 and the thirteenth transistor M13 are P-type transistors. The switching characteristics of the eleventh transistor M11 and the twelfth transistor M12 are the same, and are different from that of the ninth transistor M9, that is, the eleventh transistor M11 and the twelfth transistor M12 are N-type transistors.

Specifically, a first electrode of the ninth transistor M9 is connected to a second electrode of the twelfth transistor M12 and a second electrode of the thirteenth transistor M13, a second electrode of the ninth transistor M9 is connected to a first electrode of the tenth transistor M10, and a control electrode of the ninth transistor M9 is connected to the signal output terminal OUTPUT. A second electrode of the tenth transistor M10 is connected to a first electrode of the light-emitting device D to be driven, and a control electrode of the tenth transistor M10 is connected to the light-emitting control signal terminal EOA. A first electrode of the eleventh transistor M11 is connected to a data voltage signal terminal Data C, a second electrode of the eleventh transistor M11 is connected to a first terminal of the fourth storage capacitor C4, and a control electrode of the eleventh transistor M11 is connected to the light-emitting control signal terminal EOA. A second terminal of the fourth storage capacitor C4 is connected to the first power voltage terminal. A first electrode of the twelfth transistor M12 is connected to a first light-emitting voltage terminal, and a control electrode of the twelfth transistor M12 is connected to a control electrode of the thirteenth transistor M13, the second electrode of the eleventh transistor M11 and the first terminal of the fourth storage capacitor C4. A first electrode of the thirteenth transistor M13 is connected to a second light-emitting voltage terminal.

A method for driving a pixel driving circuit according to the embodiment of the present disclosure will be described below in conjunction with generation of the gate driving signal of the gate driving sub-circuit 1 of the pixel driving circuit. The method for driving a pixel driving circuit may specifically include a data voltage writing stage and a light-emitting stage.

In a data voltage writing stage, a high level signal is written to the light-emitting control signal terminal EOA, so that the seventh transistor M7 is turned on, the eighth transistor M8 is turned off, and a data control voltage is written to the second node R and stored in the third storage capacitor C3.

In a light-emitting stage, a low level signal is written to the light-emitting control signal terminal EOA, so that the seventh transistor M7 is turned off, the eighth transistor M8 is turned on, the saturation current Id of the fifth transistor M5 is controlled by a potential at the second node R, the charging speed of the first node Q is controlled, and thus the duty ratio of the gate driving signal output by the signal output terminal OUTPUT is controlled. When the gate driving signal is a low level and a signal input from the light-emitting control signal terminal EOA is a low level signal, the ninth transistor M9 and the tenth transistor M10 are turned on. The light-emitting is stopped when a high level signal is written to the light-emitting control signal terminal EOA. In the light-emitting stage, according to a gray scale to be displayed, a corresponding data voltage signal is written to the data voltage signal terminal Data C, and controls one of the first light-emitting voltage and the second light-emitting voltage to be output to the light-emitting device D to be driven.

Specifically, a formula of a proportional relation between brightness at any gray scale (an Nth gray scale) and brightness at a 255th gray scale is as follows:

$$\text{Brightness at an } N\text{th gray scale} = \text{brightness at a 255th gray scale} \times (N/255)^{gamma}$$

When the driving is performed by using the gate driving signal with the duty ratio, a duty ratio at the Nth gray scale is as follows:

$$\text{Duty ratio at an } N\text{th gray scale} = \text{duty ratio at a 255th gray scale} \times (N/255)^{gamma}$$

Given that the duty ratio at the 255th gray scale is 100%, that is, the light-emitting device D is always operating through the 1H display period, the duty ratios at the other gray scales may be calculated by the above formula. For example, a duty ratio at a first gray scale is 0.0005%, and a duty ratio at a 23th gray scale is 0.5%. It may be known that the duty ratio at the first gray scale (that is, the brightness) is 1/1000 of that at the 23th gray scale.

When displaying at gray scales in the high range, a low level signal is written to the data voltage signal terminal Data C, so that the thirteenth transistor M13 is turned on, the second light-emitting voltage (a high voltage) is written to the light-emitting device D to be driven, the maximum brightness is the brightness at the 255th gray scale, and the display of different gray scales of the gray scales in the high range is realized by adjusting the duty ratio of the gate driving signal output by the signal output terminal OUTPUT. However, in the gate driving sub-circuit 1, the lowest duty ratio of 0.1% (at eleventh gray scale) can be realized, and the duty ratios at first to tenth gray scales (at gray scales in the low range) cannot be realized.

When displaying at the first to tenth gray scales (at the gray scales in the low range), a high voltage is written to the data voltage signal terminal Data C, so that the twelfth transistor M12 is turned on, the first light-emitting voltage (a low voltage) is written to the light-emitting device D to be driven, the maximum brightness is the brightness at the 23th gray scale (that is, when the duty ratio of the signal output by the signal output terminal OUTPUT is 100%). In this case, when the duty ratio of the gate driving signal output by the signal output terminal OUTPUT is adjusted to be 0.1%, the brightness is 1/1000 of that at the 23th gray scale. Therefore, the display at the first gray scale can be achieved, and similarly, the display at 2nd to 22nd gray scales can be achieved.

Figure 10:
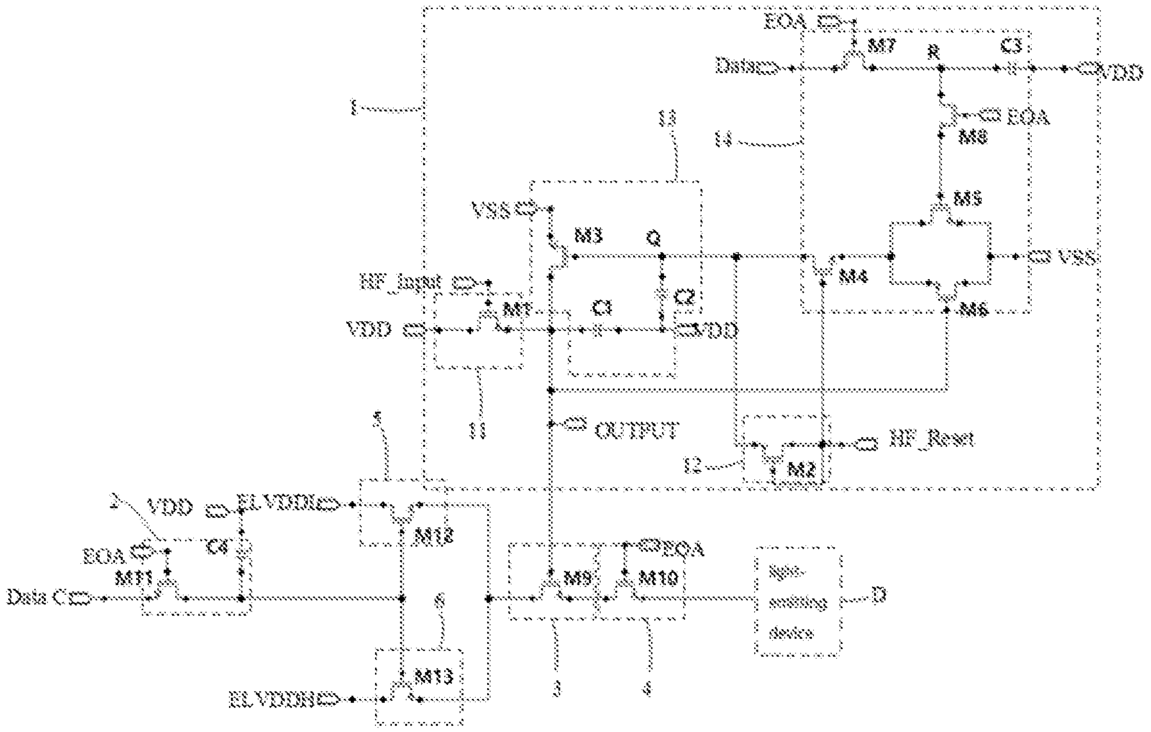
FIG. 10 is a schematic diagram of a pixel driving circuit according to an eighth example of an embodiment of the present disclosure.

In an eighth example: FIG. 10 is a schematic diagram of a pixel driving circuit according to an eighth example of an embodiment of the present disclosure. As shown in FIG. 10, the pixel driving circuit in this example is substantially the same as that in the seventh example, except that the first transistor M1 in the input module 11 of the pixel driving circuit is a P-type transistor in the eighth example. Due to a parasitic capacitance of the first transistor M1, the signal output from the signal output terminal OUTPUT is pulled up when the first transistor M1 as the N-type transistor is turned off, which may cause the leakage of the sixth transistor M6. When the first transistor M1 as the P-type transistor is turned off, the output signal from the signal output terminal OUTPUT is pulled down, thereby preventing the leakage of the sixth transistor M6.

It should be noted that the first transistor M1 is the N-type transistor, and the timing signal input by the input signal control terminal HF_Input is HF_InputH in the seventh example, and the first transistor M1 is the P-type transistor, and the timing signal input by the input signal control terminal HF_Input is HF_InputL in the eighth example, where the timing of HF_InputH is opposite to that of HF_InputL.

The remaining structures in the eighth example are the same as those in the seventh example, and the method for driving the pixel driving circuit is also the same as that in the seventh example, and therefore, the description is not repeated here.

Figure 11:
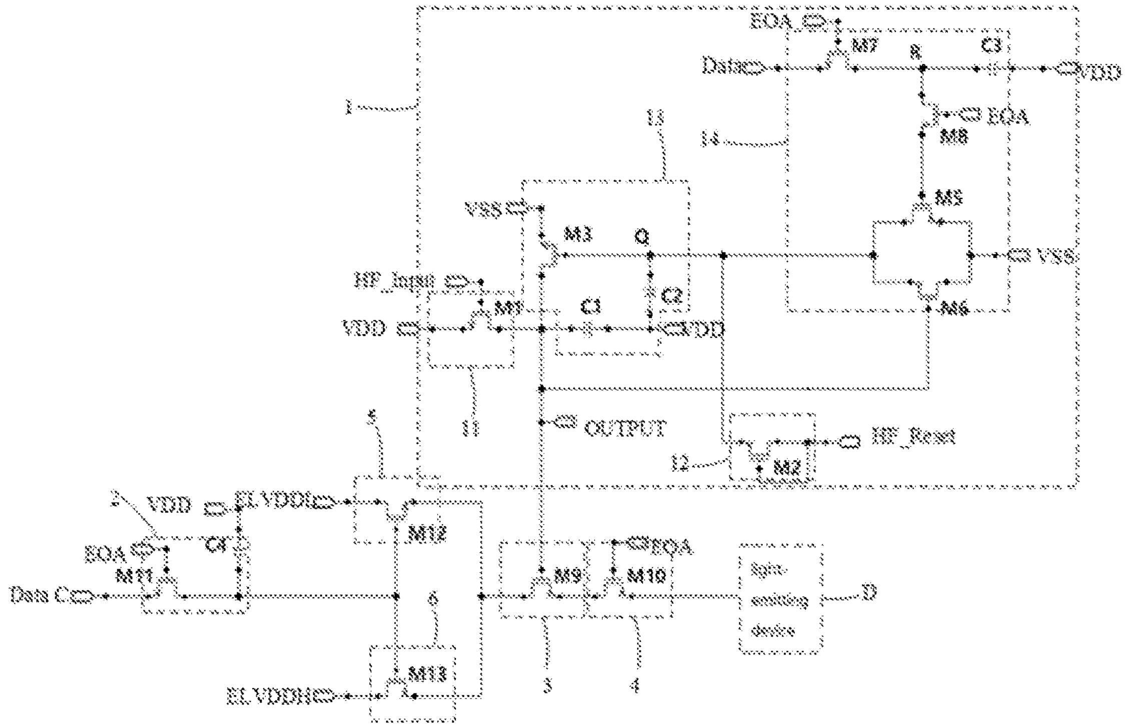
FIG. 11 is a schematic diagram of a pixel driving circuit according to a ninth example of an embodiment of the present disclosure.

In a ninth example: FIG. 11 is a schematic diagram of a pixel driving circuit according to a ninth example of an embodiment of the present disclosure. As shown in FIG. 11, the pixel driving circuit in this example is substantially the same as that in the seventh example, except that in the ninth example, the duty ratio adjusting module 14 of the pixel driving circuit does not include the fourth transistor M4, and only includes the fifth transistor M5, the sixth transistor M6, the seventh transistor M7, the eighth transistor M8 and the third storage capacitor C3. The pixel driving circuit in this example does not include the fourth transistor M4 as in the pixel driving circuit in the seventh example, but which does not affect the output of the signal output terminal OUTPUT. The pixel driving circuit has a relatively small number of transistors, thereby contributing to a high resolution and a high aperture ratio of the display panel.

The remaining structures in the ninth example are the same as those in the seventh example, and the method for driving a pixel driving circuit is also the same as that in the seventh example, and therefore, the description is not repeated here.

Figure 12:
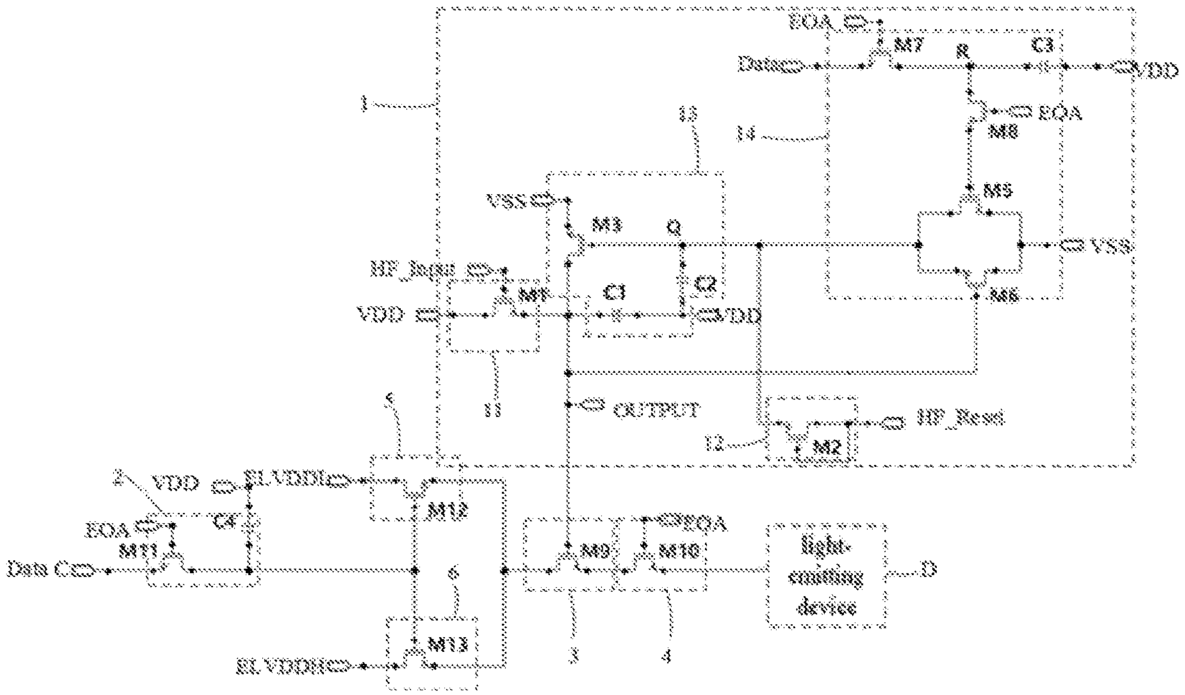
FIG. 12 is a schematic diagram of a pixel driving circuit according to a tenth example of an embodiment of the present disclosure.

In a tenth example, FIG. 12 is a schematic diagram of a pixel driving circuit according to a tenth example of an embodiment of the present disclosure. As shown in FIG. 12, the pixel driving circuit in this example is substantially the same as that in the ninth example, except that in the tenth example, the first transistor M1 in the input module 11 of the pixel driving circuit is the P-type transistor. Due to a parasitic capacitance of the first transistor M1, the signal output from the signal output terminal OUTPUT is pulled up when the first transistor M1 as the N-type transistor is turned off, which may cause the leakage of the sixth transistor M6. When the first transistor M1 as the P-type transistor is turned off, the output signal from the signal output terminal OUTPUT is pulled down, thereby preventing the leakage of the sixth transistor M6. It should be noted that the first transistor M1 is the N-type transistor, and the timing signal input by the input signal control terminal HF_Input is HF_InputH in the ninth example, and the first transistor M1 is the P-type transistor, and the timing signal input by the input signal control terminal HF_Input is HF_InputL in the tenth example, where the timing of HF_InputH is opposite to that of HF_InputL.

Figure 13:
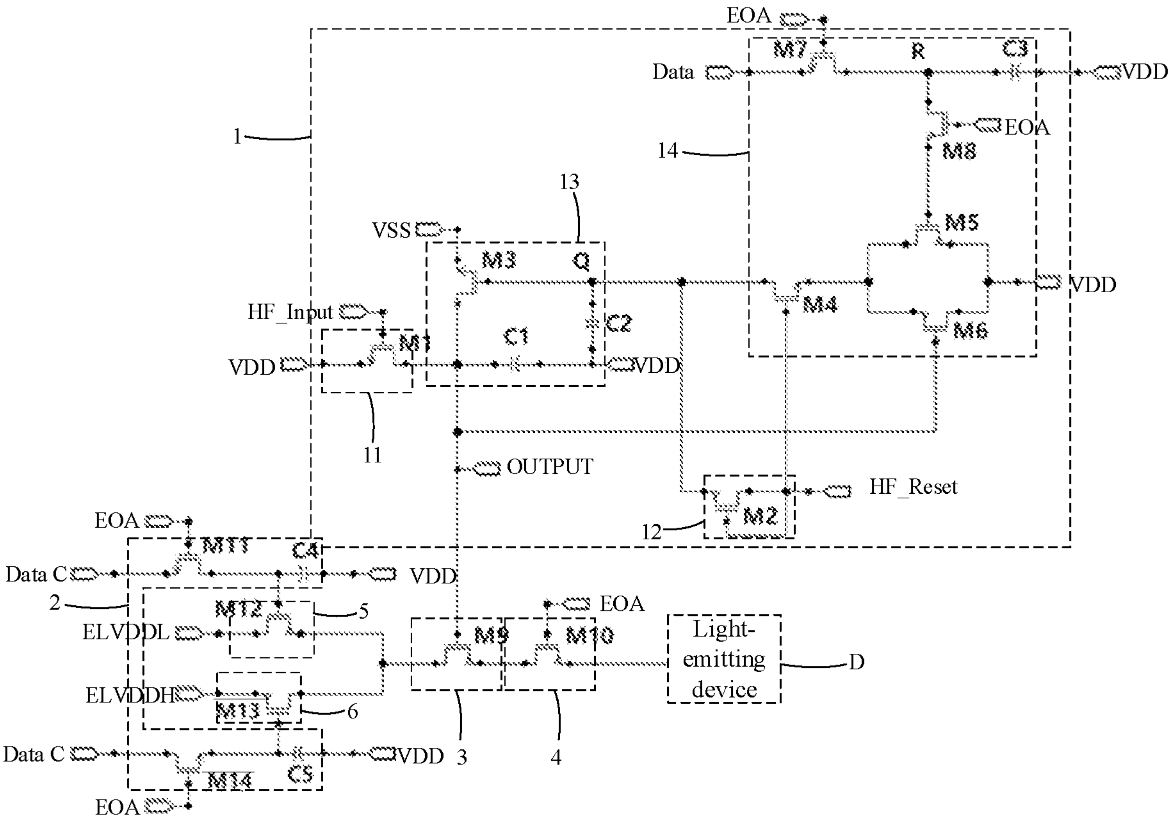
FIG. 13 is a schematic diagram of a pixel driving circuit according to an eleventh example of an embodiment of the present disclosure.

In an eleventh example: FIG. 13 is a schematic diagram of a pixel driving circuit according to an eleventh example of an embodiment of the present disclosure. As shown in FIG. 13, the pixel driving circuit in this example is substantially the same as that in the seventh example, except that the first light-emitting control sub-circuit 2 is different. The first light-emitting control sub-circuit 2 includes an eleventh transistor M11, a fourteenth transistor M14, a fourth storage capacitor C4, and a fifth storage capacitor. The switching characteristics of the eleventh transistor M11 are opposite to those of the second transistor M2, and are the same as those of the fourteenth transistor M14. That is, both the eleventh transistor M11 and the fourteenth transistor M14 are N-type transistors.

Specifically, a first electrode of the eleventh transistor M11 is connected to a data signal terminal, a second electrode of the eleventh transistor M11 is connected to a first terminal of the fourth storage capacitor C4 and a control electrode of the twelfth transistor M12, and a control electrode of the eleventh transistor M11 is connected to the light-emitting control signal terminal EOA. A second terminal of the fourth storage capacitor C4 is connected to the first power voltage terminal. A first electrode of the fourteenth transistor M14 is connected to the data signal terminal, a second electrode of the fourteenth transistor M14 is connected to a first terminal of the fifth storage capacitor, a control electrode of the thirteenth transistor M13, and a control electrode of the fourteenth transistor M14 is connected to the light-emitting control signal terminal EOA. A second terminal of the fifth storage capacitor is connected to the first power voltage terminal.

It can be seen that the control electrode of the twelfth transistor M12 connected to the first light-emitting control sub-circuit 2 is controlled by the output of the eleventh transistor M11, the control electrode of the thirteenth transistor M13 connected to the second light-emitting control sub-circuit is controlled by the output of the fourteenth transistor M14, and the first electrode of the twelfth transistor M12 is connected to the first light-emitting voltage terminal, the first electrode of the thirteenth transistor M13 is connected to the second light-emitting voltage terminal, and the eleventh transistor M11 and the fourteenth transistor M14 both output the same data voltage signal when turned on, so that the twelfth transistor M12 and the fourteenth transistor M14 may be transistors having the same switching characteristics. In the light-emitting stage, different light-emitting voltages are written to the first electrodes of the twelfth transistor M12 and the thirteenth transistor M13, so that only one of the twelfth transistor M12 and the thirteenth transistor M13 is turned on to control the light-emitting device D to be driven to emit light. That is, the twelfth transistor M12 and the thirteenth transistor M13 may be both P-type transistors or both N-type transistors. Preferably, the twelfth transistor M12 and the thirteenth transistor M13 are transistors having the same switching characteristics as the eleventh transistor M11 and the fourteenth transistor M14, that is, N-type transistors, so as to be easily formed.

The remaining structures of the pixel driving circuit in the eleventh example are the same as those in the seventh example, and therefore are not described again. The gate driving sub-circuit 1 in the pixel driving circuit in the eleventh example is the same as that in the seventh example, the method of generating the gate driving signal in the eleventh example is also the same as that in the seventh example, and thus is not repeated.

A method for driving a pixel driving circuit according to the embodiment of the present disclosure will be described below in conjunction with generation of the gate driving signal of the gate driving sub-circuit 1 of the pixel driving circuit in the seventh example. The method for driving a pixel driving circuit may specifically include a data voltage writing stage.

In the data voltage writing stage, a high level signal is written to the light-emitting control signal terminal EOA, so that the seventh transistor M7 is turned on, the eighth transistor M8 is turned off, and a data control voltage is written to the second node R and stored in the third storage capacitor C3. The eleventh transistor M11 and the fourteenth transistor M14 are turned on, and data voltage signals are written to the control electrode of the twelfth transistor M12 and the fourth storage capacitor C4, and the control electrode of the thirteenth transistor M13 and the fifth storage capacitor, respectively. The data voltage signal controls one of the first light-emitting voltage and the second light-emitting voltage to be written to the first electrode of the light-emitting device D to be driven. If the twelfth transistor M12 is turned on by the data voltage signal, the first light-emitting voltage participates in the light-emitting to realize the display at the gray scales in the low range, and if the thirteenth transistor M13 is turned on by the data voltage signal, the second light-emitting voltage participates in the light-emitting to realize the display at the gray scales in the high range.

When displaying at gray scales in the high range, a high level signal is written to the data voltage signal terminal Data C, so that the thirteenth transistor M13 is turned on, the second light-emitting voltage (a high voltage) is written to the light-emitting device D to be driven, the maximum brightness is the brightness at the 255th gray scale, and the display of different gray scales of the gray scales in the high range is realized by adjusting the duty ratio of the gate driving signal output by the signal output terminal OUTPUT. However, in the gate driving sub-circuit 1, the lowest duty ratio of 0.1% (at eleventh gray scale) can be realized, and the duty ratios at first to tenth gray scales (at gray scales in the low range) cannot be realized.

When displaying at the first to tenth gray scales (at the gray scales in the low range), a high voltage is written to the data voltage signal terminal Data C, so that the twelfth transistor M12 is turned on, the first light-emitting voltage (a low voltage) is written to the light-emitting device D to be driven, the maximum brightness is the brightness at the 23th gray scale (that is, when the duty ratio of the signal output by the signal output terminal OUTPUT is 100%). In this case, when the duty ratio of the gate driving signal output by the signal output terminal OUTPUT is adjusted to be 0.1%, the brightness is 1/1000 of that at the 23th gray scale. Therefore, the display at the first gray scale can be achieved, and similarly, the display at 2nd to 22nd gray scales can be achieved.

Referring to FIG. 13, by writing different data voltage control signals, the duty ratio of the gate driving signal output by the signal output terminal OUTPUT may be adjusted, so as to realize the display at the gray scales in the high range and in the low range by matching with the first light-emitting voltage and the second light-emitting voltage.

Figure 14:
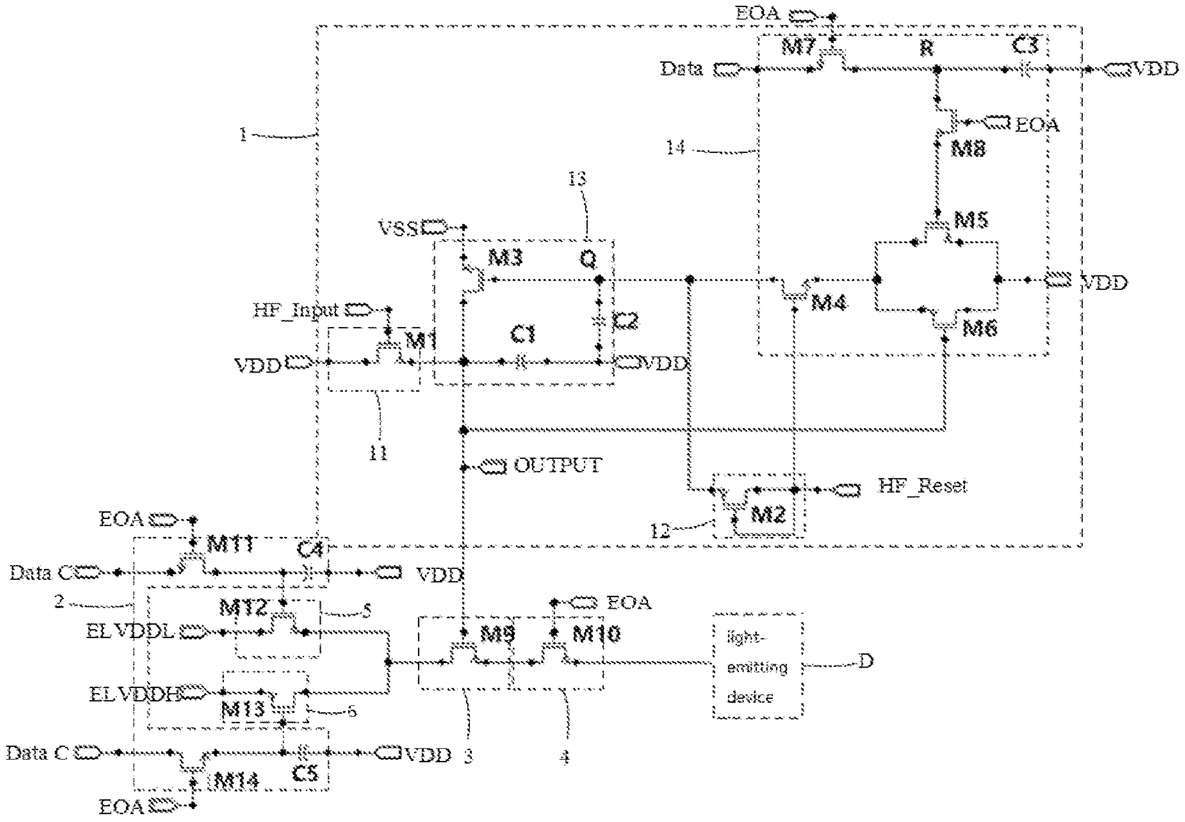
FIG. 14 is a schematic diagram of a pixel driving circuit according to a twelfth example of an embodiment of the present disclosure.

In a twelfth example: FIG. 14 is a schematic diagram of a pixel driving circuit according to a twelfth example of an embodiment of the present disclosure. As shown in FIG. 14, the pixel driving circuit in this example is substantially the same as that in the eleventh example, only except that the first transistor M1 in the input module 11 of the pixel driving circuit is the P-type transistor in the twelfth example. Due to a parasitic capacitance of the first transistor M1, the signal output from the signal output terminal OUTPUT is pulled up when the first transistor M1 as the N-type transistor is turned off, which may cause the leakage of the sixth transistor M6. When the first transistor M1 as the P-type transistor is turned off, the output signal from the signal output terminal OUTPUT is pulled down, thereby preventing the leakage of the sixth transistor M6. It should be noted that the first transistor M1 is the N-type transistor, and the timing signal input by the input signal control terminal HF_Input is HF_InputH in the eleventh example, and the first transistor M1 is the P-type transistor, and the timing signal input by the input signal control terminal HF_Input is HF_InputL in the twelfth example, where the timing of HF_InputH is opposite to that of HF_InputL.

The remaining structures in the twelfth example are the same as those in the eleventh example, and the method for driving a pixel driving circuit is also the same as that in the eleventh example, and therefore, the description is not repeated here.

Figure 15:
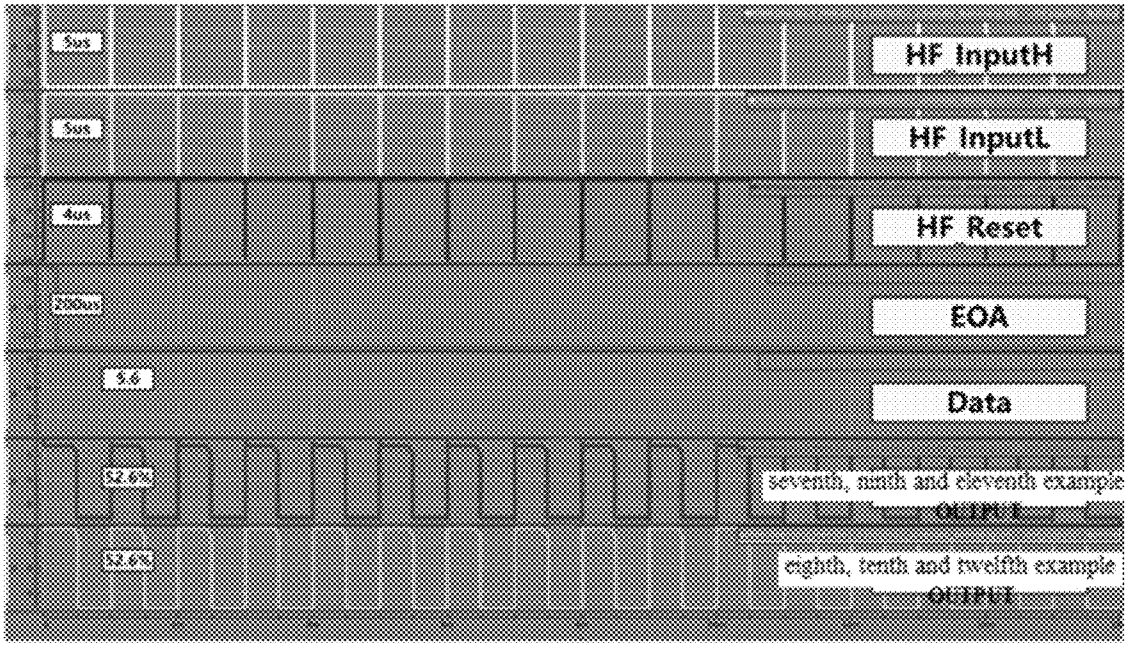
FIGS. 15 and 16 are simulation diagrams of outputs at a signal output terminal of a gate driving sub-circuit of the pixel driving circuit under different data control voltages according to the seventh example to the twelfth example of the embodiment of the present disclosure.
Figure 16:
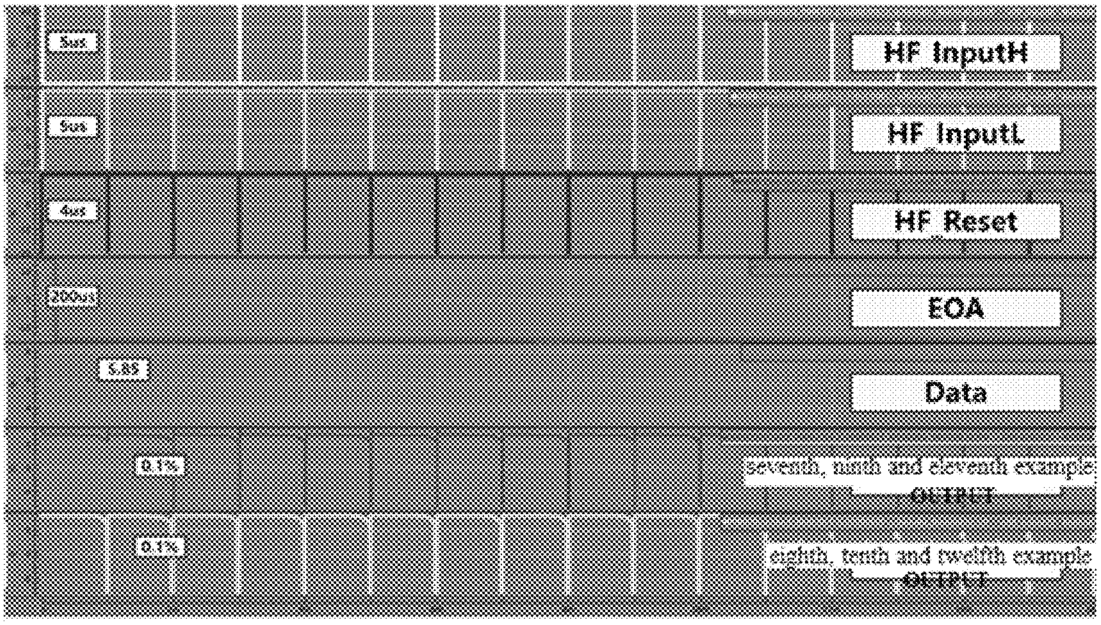

FIGS. 15 and 16 are simulation diagrams of outputs at a signal output terminal OUTPUT of a gate driving sub-circuit 1 of the pixel driving circuit under different data control voltages according to the seventh example to the twelfth example of the embodiment of the present disclosure. As shown in FIGS. 15 and 16, by writing different data voltage control signals, the duty ratio of the gate driving signal output by the signal output terminal OUTPUT may be adjusted, so as to realize the display at the gray scales in the high range and in the low range by matching with the first light-emitting voltage and the second light-emitting voltage.

The embodiment of the present disclosure provides a display apparatus, which includes the pixel driving circuit in any one of the above embodiments. Of course, the display apparatus further includes a light-emitting device electrically connected to the pixel driving circuit. The light-emitting device may be an organic light-emitting diode (OLED). Alternatively, the light-emitting device may also be a micro inorganic light-emitting diode, and further, may be an electric current type light-emitting diode, such as a micro light-emitting diode (micro LED) or a mini light-emitting diode (mini LED).

The display apparatus may be: any product or component having a display function, such as a mobile phone, a tablet computer, a television, a display, a notebook computer, a digital photo frame, a navigator, or the like, which is not limited in the embodiment of the present disclosure.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A pixel driving circuit, comprising a gate driving sub-circuit, a first light-emitting control sub-circuit, a first voltage control sub-circuit, a second voltage control sub-circuit, a light-emitting time control sub-circuit and a second light-emitting control sub-circuit; wherein the gate driving sub-circuit is configured to output a gate driving signal with an adjustable duty ratio;

the first light-emitting control sub-circuit is configured to control the first voltage control sub-circuit to output a first light-emitting voltage by a data voltage signal or control the second voltage control sub-circuit to output a second light-emitting voltage by the data voltage signal in response to a light-emitting control signal; the light-emitting time control sub-circuit is configured to output the first light-emitting voltage or the second light-emitting voltage received by the light-emitting time control sub-circuit under the control of the gate driving signal; and the second light-emitting control sub-circuit is configured to output the received first light-emitting voltage or the received second light-emitting voltage to a light-emitting device to be driven under the control of the light-emitting control signal; wherein the gate driving sub-circuit comprises:

an input module configured to control a signal output terminal to output a first power voltage or a second power voltage in response to an input control signal;

a reset module configured to reset a first node through a reset signal in response to the reset signal; wherein the first node is a connecting node between the output module and the duty ratio adjusting module;

a duty ratio adjusting module configured to control a potential at the first node through a data voltage control signal in response to the light-emitting control signal; and an output module configured to output the gate driving signal with a corresponding duty ratio through a signal output terminal in response to the potential at the first node; wherein a potential of the gate driving signal is switched between the first power voltage and the second power voltage.

2. The pixel driving circuit according to claim 1, wherein the input module comprises a first transistor, a first electrode of the first transistor is connected to a second power voltage terminal, a second electrode of the first transistor is connected to the output module, and a control electrode of the first transistor is connected to an input signal control terminal.

3. The pixel driving circuit according to claim 2, wherein the reset module comprises a second transistor, a first electrode of the second transistor is connected to the first node, and a second electrode of the second transistor is connected to a control electrode of the second transistor and a reset signal terminal.

4. The pixel driving circuit according to claim 3, wherein the output module comprises a third transistor, a first storage capacitor, and a second storage capacitor; and switching characteristics of the third transistor are opposite to switching characteristics of the second transistor; and a first electrode of the third transistor is connected to a first power voltage terminal, a second electrode of the third transistor is connected to the signal output terminal and a first terminal of the first storage capacitor, and a control electrode of the third transistor is connected to the first node, a second terminal of the first storage capacitor is connected to a second terminal of the second storage capacitor and the second power voltage terminal, and a first terminal of the second storage capacitor is connected to the first node.

5. The pixel driving circuit according to claim 3, wherein the duty ratio adjusting module comprises a fourth transistor, a fifth transistor, a sixth transistor, a seventh transistor, an eighth transistor, and a third storage capacitor, switching characteristics of the fourth transistor and the seventh transistor are opposite to switching characteristics of the second transistor, and switching characteristics of the fifth transistor, the sixth transistor, and the eighth transistor are all the same as the switching characteristics of the second transistor; and a first electrode of the fourth transistor is connected to the first node, a second electrode of the fourth transistor is connected to a first electrode of the fifth transistor and a first electrode of the sixth transistor, and a control electrode of the fourth transistor is connected to the reset signal terminal, a second electrode of the fifth transistor is connected to a second electrode of the sixth transistor and the second power voltage terminal, and a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, and a control electrode of the seventh transistor is connected to a light-emitting control signal terminal, a control electrode of the eighth transistor is connected to the light-emitting control signal terminal, and a second terminal of the third storage capacitor is connected to a first power voltage terminal.

6. The pixel driving circuit according to claim 3, wherein the duty ratio adjusting module comprises a fifth transistor, a sixth transistor, a seventh transistor, an eighth transistor, and a third storage capacitor, switching characteristics of the seventh transistor are opposite to switching characteristics of the second transistor, and switching characteristics of the fifth transistor, the sixth transistor, and the eighth transistor are all the same as the switching characteristics of the second transistor; and a first electrode of the fifth transistor is connected to a first electrode of the sixth transistor and the first node, a second electrode of the fifth transistor is connected to a second electrode of the sixth transistor and the second power voltage terminal, and a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, and a control electrode of the seventh transistor is connected to a light-emitting control signal terminal, a control electrode of the eighth transistor is connected to the light-emitting control signal terminal, and a second terminal of the third storage capacitor is connected to a first power voltage terminal.

7. The pixel driving circuit according to claim 1, wherein the input module comprises a first transistor, a first electrode of the first transistor is connected to a first power voltage terminal, a second electrode of the first transistor is connected to the output module, and a control electrode of the first transistor is connected to an input signal control terminal.

8. The pixel driving circuit according to claim 7, wherein the reset module comprises a second transistor, a first electrode of the second transistor is connected to the first node, and a second electrode of the second transistor is connected to a control electrode of the second transistor and a reset signal terminal.

9. The pixel driving circuit according to claim 8, wherein the output module comprises a third transistor, a first storage capacitor and a second storage capacitor, and switching characteristics of the third transistor are opposite to switching characteristics of the second transistor; and a first electrode of the third transistor is connected to a second power voltage terminal, a second electrode of the third transistor is connected to the signal output terminal and a first terminal of the first storage capacitor, a control electrode of the third transistor is connected to the first node, a second terminal of the first storage capacitor is connected to a second terminal of the second storage capacitor and the second power voltage terminal, and a first terminal of the second storage capacitor is connected to the first node.

10. The pixel driving circuit according to claim 8, wherein the duty ratio adjusting module comprises a fourth transistor, a fifth transistor, a sixth transistor, a seventh transistor, an eighth transistor, and a third storage capacitor, switching characteristics of the fourth transistor and the seventh transistor are opposite to switching characteristics of the second transistor, and switching characteristics of the fifth transistor, the sixth transistor, and the eighth transistor are all the same as the switching characteristics of the second transistor; and a first electrode of the fourth transistor is connected to the first node, a second electrode of the fourth transistor is connected to a first electrode of the fifth transistor and a first electrode of the sixth transistor, a control electrode of the fourth transistor is connected to the reset signal terminal, a second electrode of the fifth transistor is connected to a second electrode of the sixth transistor and the first power voltage terminal, a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, a control electrode of the seventh transistor is connected to a light-emitting control signal terminal, a control electrode of the eighth transistor is connected to the light-emitting control signal terminal, and a second terminal of the third storage capacitor is connected to the first power voltage terminal.

11. The pixel driving circuit according to claim 8, wherein the duty ratio adjusting module comprises a fifth transistor, a sixth transistor, a seventh transistor, an eighth transistor, and a third storage capacitor, switching characteristics of the seventh transistor are opposite to switching characteristics of the second transistor, and switching characteristics of the fifth transistor, the sixth transistor, and the eighth transistor are all the same as the switching characteristics of the second transistor; and a first electrode of the fifth transistor is connected to a first electrode of the sixth transistor and the first node, a second electrode of the fifth transistor is connected to a second electrode of the sixth transistor and the first power voltage terminal, a control electrode of the fifth transistor is connected to a second electrode of the eighth transistor, a control electrode of the sixth transistor is connected to the signal output terminal, a first electrode of the seventh transistor is connected to a data voltage control signal terminal, a second electrode of the seventh transistor is connected to a first terminal of the third storage capacitor and a first electrode of the eighth transistor, a control electrode of the seventh transistor is connected to a light-emitting control signal terminal, a control electrode of the eighth transistor is connected to the light-emitting control signal terminal, and a second terminal of the third storage capacitor is connected to the first power voltage terminal.

12. The pixel driving circuit according to claim 3, wherein the first light-emitting control sub-circuit comprises an eleventh transistor and a fourth storage capacitor, and switching characteristics of the eleventh transistor are opposite to switching characteristics of the second transistor; and a first electrode of the eleventh transistor is connected to a data signal terminal, a second electrode of the eleventh transistor is connected to a first terminal of the fourth storage capacitor, the first voltage control sub-circuit and the second voltage control sub-circuit, a control electrode of the eleventh transistor is connected to a light-emitting control signal terminal, and a second terminal of the fourth storage capacitor is connected to the first power voltage terminal.

13. The pixel driving circuit according to claim 12, wherein the first voltage control sub-circuit comprises a twelfth transistor, the second voltage control sub-circuit comprises a thirteenth transistor, and switching characteristics of the twelfth transistor are the same as switching characteristics of the eleventh transistor, and are opposite to switching characteristics of the thirteenth transistor; and a first electrode of the twelfth transistor is connected to a first voltage terminal, a second electrode of the twelfth transistor is connected to a second electrode of the thirteenth transistor and the light-emitting time control sub-circuit, a control electrode of the twelfth transistor is connected to a control electrode of the thirteenth transistor and a second electrode of the eleventh transistor, and a first electrode of the thirteenth transistor is connected to a second voltage terminal.

14. The pixel driving circuit according to claim 3, wherein the first light-emitting control sub-circuit comprises an eleventh transistor, a fourteenth transistor, a fourth storage capacitor, and a fifth storage capacitor, and switching characteristics of the eleventh transistor are opposite to switching characteristics of the second transistor and are the same as switching characteristics of the fourteenth transistor;

a first electrode of the eleventh transistor is connected to a data signal terminal, a second electrode of the eleventh transistor is connected to a first terminal of the fourth storage capacitor and the first voltage control sub-circuit, a control electrode of the eleventh transistor is connected to the light-emitting control signal terminal, and a second terminal of the fourth storage capacitor is connected to the first power voltage terminal; and a first electrode of the fourteenth transistor is connected to the data signal terminal, a second electrode of the fourteenth transistor is connected to a first terminal of the fifth storage capacitor and the second voltage control sub-circuit, a control electrode of the fourteenth transistor is connected to the light-emitting control signal terminal, and a second terminal of the fifth storage capacitor is connected to the first power voltage terminal.

15. The pixel driving circuit according to claim 14, wherein the first voltage control sub-circuit comprises a twelfth transistor, the second voltage control sub-circuit comprises a thirteenth transistor, and switching characteristics of the twelfth transistor are opposite to switching characteristics of the thirteenth transistor; and a first electrode of the twelfth transistor is connected to a first voltage terminal, a second electrode of the twelfth transistor is connected to a second electrode of the thirteenth transistor and the light-emitting time control sub-circuit, a control electrode of the twelfth transistor is connected to a control electrode of the thirteenth transistor and a second electrode of the eleventh transistor, and a first electrode of the thirteenth transistor is connected to a second voltage terminal.

16. The pixel driving circuit according to claim 15, wherein the switching characteristics of the thirteenth transistor and the eleventh transistor are the same.

17. The pixel driving circuit according to claim 12, wherein the light-emitting time control sub-circuit comprises a ninth transistor, and switching characteristics of the ninth transistor are the same as switching characteristics of the second transistor; and a first electrode of the ninth transistor is connected to the first voltage control sub-circuit and the second voltage control sub-circuit, a second electrode of the ninth transistor is connected to the second light-emitting control sub-circuit, and a control electrode of the ninth transistor is connected to the signal output terminal.

18. The pixel driving circuit according to claim 12, wherein the second light-emitting control sub-circuit comprises a tenth transistor, and switching characteristics of the tenth transistor are the same as switching characteristics of the second transistor; and a first electrode of the tenth transistor is connected to the light-emitting time control sub-circuit, a second electrode of the tenth transistor is connected to the light-emitting device to be driven, and a control electrode of the tenth transistor is connected to a light-emitting control terminal.

19. The pixel driving circuit according to claim 1, wherein the light-emitting device to be driven comprises any one of an LED, an OLED, a micro LED, and a mini LED.

20. A display apparatus, comprising the pixel driving circuit according to claim 1.

* * * * *